United States Patent
Nakagaki et al.

(10) Patent No.: US 6,399,941 B1
(45) Date of Patent: Jun. 4, 2002

(54) INCLINATION ANGLE SENSOR

(75) Inventors: Toshiya Nakagaki, Hashimoto; Masaharu Ushihara, Hirakata; Nobuharu Katsuki, Kyotanabe, all of (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 0 days.

(21) Appl. No.: 09/355,699
(22) PCT Filed: Dec. 1, 1998
(86) PCT No.: PCT/JP98/05399
§ 371 (c)(1), (2), (4) Date: Aug. 2, 1999
(87) PCT Pub. No.: WO99/28705
PCT Pub. Date: Oct. 6, 1999

(30) Foreign Application Priority Data

Dec. 2, 1997 (JP) .............................................. 9-331439
Mar. 4, 1998 (JP) ........................................... 10-051725
Apr. 9, 1998 (JP) ........................................... 10-097272

(51) Int. Cl.[7] .................................................. G01D 5/34
(52) U.S. Cl. ........................... 250/231.13; 250/231.18; 250/231.1; 200/61.45 R
(58) Field of Search ...................... 250/231.13, 231.14, 250/231.17, 231.18, 231.1, 221; 356/138, 614; 200/61.45 R, 61.52, 61.45 M; 33/391, 399

(56) References Cited

U.S. PATENT DOCUMENTS 6,093,928 A * 7/2000 Ohtomot et al. ....... 250/231.13
6,140,635 A * 10/2000 Kazumi et al. .......... 250/231.1

FOREIGN PATENT DOCUMENTS

| JP | 60-154108 | 8/1985 |
|---|---|---|
| JP | 61-114314 | 7/1986 |
| JP | 4-74926 | 3/1992 |
| JP | 58-168911 | 10/1993 |
| JP | 6-325916 | 11/1994 |
| JP | 8-189826 | 7/1996 |
| JP | 10-170262 | 6/1998 |
| JP | 2001124550 A * | 5/2001 |

OTHER PUBLICATIONS

Japanese search report for Int'l Appln. No. PCT/JP98/05399 dated Jan. 26, 1999.
English translation of Japanese search report.

* cited by examiner

*Primary Examiner*—Kevin Pyo
(74) *Attorney, Agent, or Firm*—Ratner & Prestia, PC

(57) ABSTRACT

The present invention aims at providing an inclination angle sensor that can be mounted on a vehicle such as an automobile, resistant to external disturbances such as vibrations, superior in rotational performance, and small in size. In order to achieve the object, an inclination angle sensor of the present invention includes: a non-magnetic and electrically conductive weight (1); a rotary shaft (2) fixed to the weight (1); a bearing (3) for rotatably supporting the rotary shaft (2); a frame (4) for securing the bearing (3); one or two combinations of reflection type photo-interrupter (6) consisting of a light-receiving element (27) and a light-emitting element (26) for varying signal in response to a movement of the weight (1); a flange part (7) provided to outstretch from an outer perimeter of the weight in parallel to or in a manner to form a predetermined angle with the rotary shaft (2); and a magnet (8) fixed to the frame (4) in a manner produce magnetic flux primarily toward the flange part (7).

8 Claims, 22 Drawing Sheets

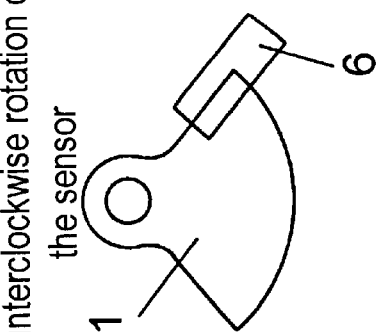
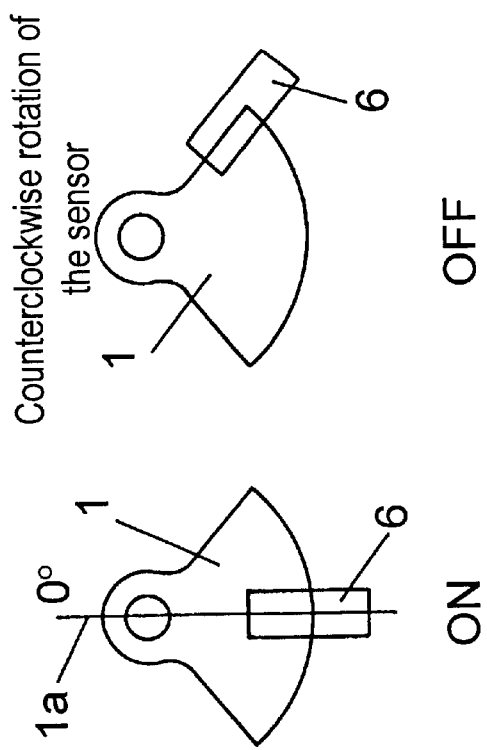
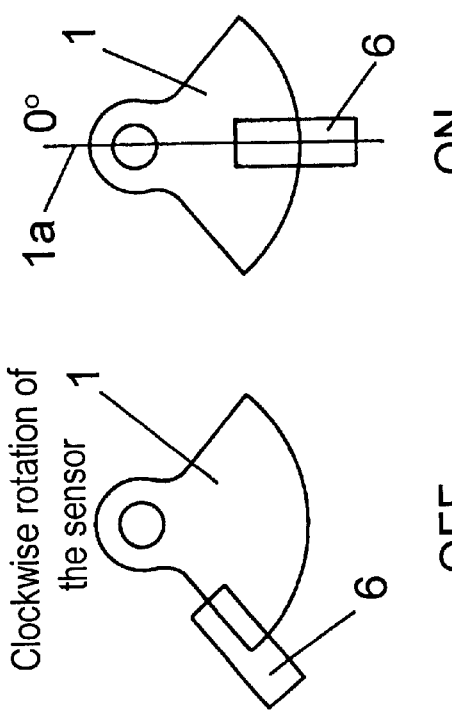
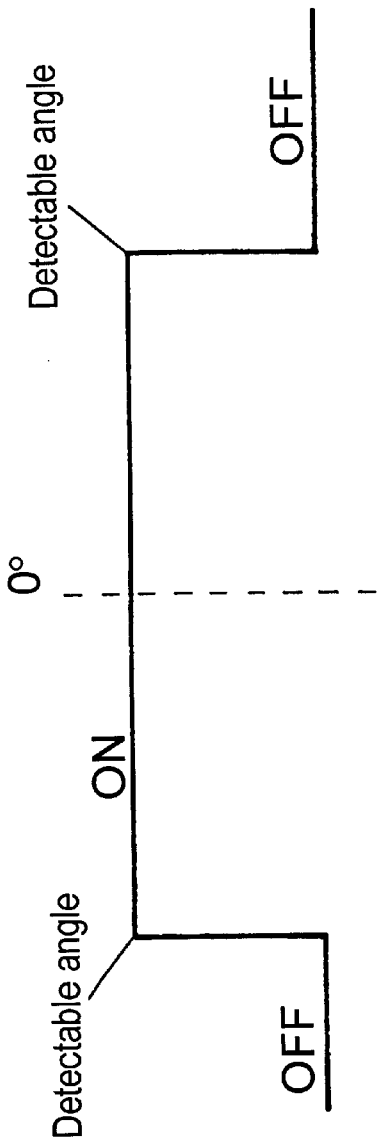

Clockwise rotation of the sensor

OFF (6L)

ON (6L, 6R)

Counterclockwise rotation of the sensor

OFF (6R)

INCLINATION ANGLE SENSOR

THIS APPLICATION IS A U.S. NATIONAL PHASE APPLICATION OF PCT INTERNATIONAL APPLICATION PCT/JP98/05399.

FIELD OF THE INVENTION

The present invention relates to an inclination angle sensor to be mounted on a vehicle such as an automobile for measuring an inclination angle of the vehicle with respect to a direction of gravity.

BACKGROUND OF THE INVENTION

As one of safety mechanisms for automobiles, airbag system that operates in the event of accident such as a head-on collision, a broadside collision, and the like, has spread widely in recent years. Since such accident may involve a turning-over of automobile, an inclination angle sensor capable of operating a safety mechanism by detecting behavior of a rotating vehicle is considered useful.

An inclination angle sensor disclosed in Japanese Patent Laid-Open Publication No. S60-154108 has been known in the past. FIG. 27 shows an inclination angle sensor of the prior art. A pendulum element 201 of flat plate changes its angle with respect to a base plate 202 according to an inclination angle of an automobile. The angle is detected with presence or absence of transmitted light of a transmission type photo-interrupter 204 mounted by an outer periphery of the pendulum element 201 in a manner to sandwich slits provided along the outer periphery of the pendulum element 201. Magnets 203 are also provided on the base plate 202, so that the pendulum element 201 rotates in a direction traverse to a magnetic flux of the magnet 203. When the pendulum element 201 rotates at a speed of "V", an induction voltage is generated within the pendulum element 201 in a direction perpendicular to the rotational direction, and an eddy current is generated by the induction voltage. The eddy current then generates a force in proportion to the speed "V" within the pendulum element 201 in a direction opposite to the rotational direction, and this force functions as a damping force to stabilize rotation of the pendulum element 201.

Inclination angle sensors of this kind for installation in vehicles such as automobiles are required to be small in size and superior in rotational performance, since they are mounted within a control unit.

However, the foregoing inclination angle sensor of the prior art has a problem that it is difficult to reduce the size because of structural restrictions such as a diametrical dimension of rotary shaft and a center of gravity of the pendulum element, both of which affect the rotational performance, and the photo-interrupter, which needs to be mounted around an outer periphery of the pendulum element.

SUMMARY OF THE INVENTION

The present invention is intended to solve the foregoing problem, and it aims at providing an inclination angle sensor that can be mounted on a vehicle such as an automobile, small in size, and superior in rotational performance.

In order to solve the problem, an inclination angle sensor of the present invention includes: a weight of conductive and non-magnetic material; a rotary shaft fixed to the weight; a bearing for rotatably supporting the rotary shaft; a frame for securing the bearing; one or two combinations of reflection type photo-interrupter consisting of a light-emitting element and a light-receiving element of which signal vary in response to a movement of the weight; a flange part provided to outstretch from an outer perimeter of the weight in parallel to or in a manner to form a predetermined angle with the rotary shaft; a magnet fixed to the frame in a manner produce magnetic flux primarily toward the flange part; and a circuit unit for processing the signal.

The foregoing structure realizes the inclination angle sensor that is small in size and superior in rotational performance.

BRIEF DESCRIPTION OF THE DRAWINGS

FIGS. 2A–2C are operational figures, in which one reflection type photo-interrupter is utilized in the same exemplary embodiment;

FIG. 2D is a figure depicting an output waveform of the same exemplary embodiment;

DESCRIPTION OF THE PREFERRED EMBODIMENTS

First Exemplary Embodiment

Figure 1A:
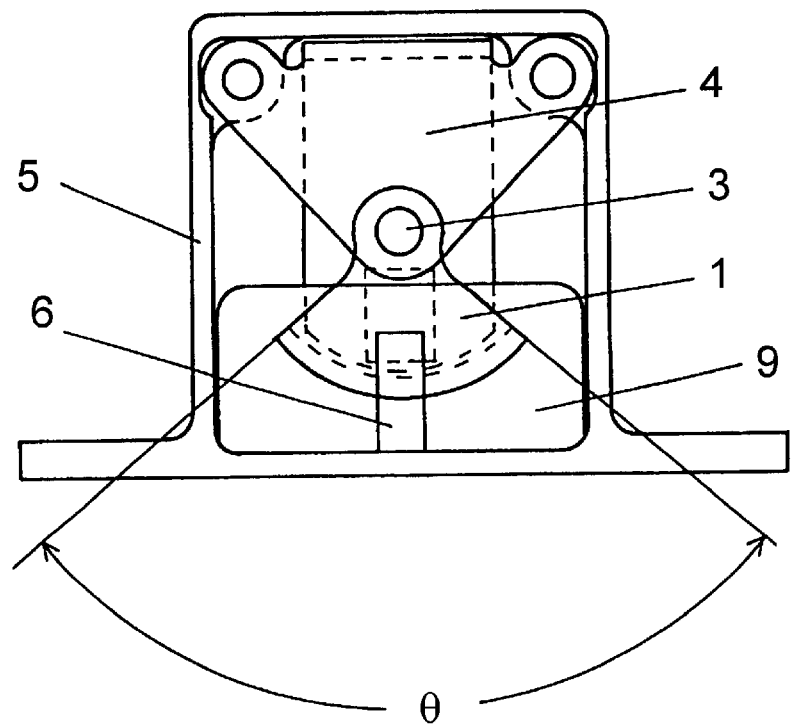
FIG. 1A is a structural view depicting a first exemplary embodiment of the present invention.
Figure 1B:
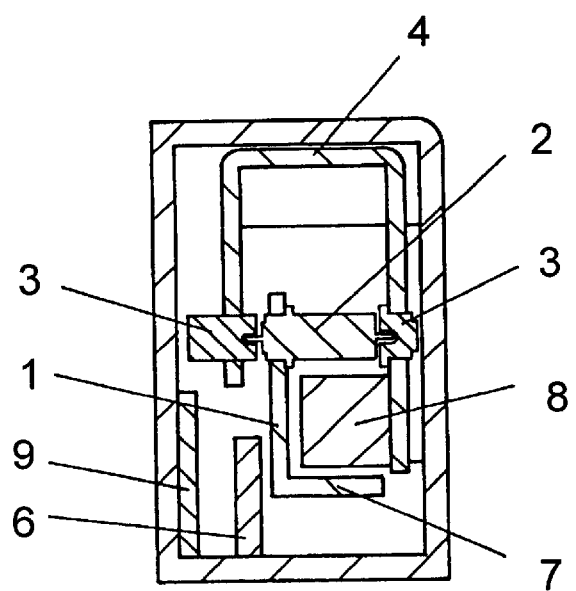
FIG. 1B is a cross-sectional view of the same exemplary embodiment.

FIG. 1A depicts a structural view for help in describing an inclination angle sensor of a first exemplary embodiment of the present invention, and FIG. 1B depicts a cross-sectional view of the same sensor. In FIGS. 1A and 1B, 1 represents a weight using material such as copper,. aluminum and the like that are non-magnetic and superior in electrical conductivity, 2 represents a rotary shaft fixed to the weight 1, 3 represents a pair of bearings for rotatably supporting the rotary shaft 2, 4 represents a frame for supporting the bearings 3, 5 represents a case for enclosing and fixing the frame 4, 6 represents a reflection type photo-interrupter consisting of a light-emitting element and a light-receiving element, 7 represents a flange part constructed around an outer perimeter of the weight 1 in parallel to or in a manner to form a predetermined angle with the rotary shaft 2, and 8 represents a magnet for generating magnetic flux primarily in a direction toward the flange part 7 and fixed to the frame 4. 9 represents a circuit unit for processing a signal. The reflection type photo-interrupter 6 is connected to the circuit unit 9 for processing a signal, and it is secured to the case 5.

In this exemplary embodiment, shape of a surface perpendicular to the rotary shaft 2 of the weight 1 is a sector form with a sectorial angle "θ" of 120°, and a rotational radius of 10 mm. An outer perimeter of the weight 1 in the shape of sector form is provided with the flange part 7, which outstretches 5 mm in a direction parallel to the rotary shaft 2, and they shape like a letter L in cross-section. A diameter of the rotary shaft 2 is 0.4 mm. The bearings 3 are made of oil-impregnated alloy in order to reduce a friction with the shaft. An eddy current is induced in the flange part 7 in proportion to a movement of the weight 1 with the action of magnetic flux generated by the magnet 8 in the direction toward primarily the flange part 7, thereby becoming a damping force.

The inclination angle sensor of the foregoing structure is able to maintain an angle of 1° or less in which the weight 1 follows after a rotation of fixed components such as the frame 4 and the reflection type photo-interrupter 6, when the entire sensor is rotated at a low velocity. However, the angle, for which the weight 1 follows, doubles to 2°, only if the flange part 7 is not provided in a sensor of otherwise identical structure. Provision of the flange part 7 thus achieves a highly accurate rotational performance. This improvement of performance is due to an increase in torque that forces the weight 1 to keep itself toward the gravitational direction by overcoming friction between the rotary shaft 2 and the bearings 3, since the provision of the flange part 7 virtually increases a distance to the center of gravity from a center of the rotary shaft 2. The provision of the flange part 7 realizes not only the highly accurate rotational performance, but also a reduction in size.

An operating mode, in which the reflection type photo-interrupter 6 develops a signal in response to a movement of the weight 1, and a resulting waveform will be described next by referring to FIGS. 2A–2D.

The reflection type photo-interrupter 6, the bearings 3, the frame 4, and the case 5 are all fixed securely to an object being measured of an inclination angle (e.g. an automobile). Therefore, when the inclination angle sensor is in a state of being kept horizontal in its entirety, a symmetrical axis 1a of the sector-shaped surface of the weight 1 orients in the gravitational direction, and it also coincides with a central axis of the reflection type photo-interrupter 6, as shown in FIG. 2B. This state represents an inclination angle of 0°, so that the reflection type photo-interrupter 6 is in an on state (ON) with light reflected by the sector-shaped surface of the weight 1. When the inclination angle sensor is in a rotated state to either counterclockwise or clockwise in its entirety along with the measuring object (inclined state), the reflection type photo-interrupter 6 also rotates (inclines) counterclockwise or clockwise along with the measuring object, although the symmetrical axis of the sector-shaped surface of the weight 1 still remains in the gravitational direction, as shown in FIGS. 2A–2C. A relative magnitude of the foregoing movement is an inclination angle in principle. The reflection type photo-interrupter 6 remains closed (ON) while the light is being reflected by the sector-shaped surface of the weight 1, it goes off (OFF) if the light is no longer reflected by the surface as a magnitude of inclination of the measuring object increases.

Although the foregoing exemplary embodiment is an example, in which the flange part 7 outstretches toward the direction parallel to the rotary shaft 2 in the cross-sectional shape of a letter L, it needs not be parallel in the strict sense. Also, an equivalent or even better effect can be attained, if the weight 1 including the flange part 7 is adopted to form an inverted letter T, a letter J, a letter W, etc., since these shapes further increase a virtual distance from a center of the rotary shaft 2 to the center of gravity, as a matter of course.

Also, the present exemplary embodiment, which is provided with the flange part 7 outstretching toward the direction parallel to the rotary shaft 2 around the outer perimeter of the weight 1, attains a higher damping effect of eddy current proportional to velocity "V", since it can gain a greater velocity "V" with the same radial ratio as compared to one which uses the pendulum element 201 of the prior art.

Further, the present exemplary embodiment for adopting a structure, in which the reflection type photo-interrupter 6 is arranged in a manner to face against the sector-shaped surface of the weight 1 in a direction of the rotary shaft 2, makes it possible to reduce a dimension in radial direction around a center of the rotary shaft 2, since it does not require such an arrangement as the prior art for the transmission type photo-interrupter 204 to sandwich the pendulum element 201 from the outside.

Figure 3A:
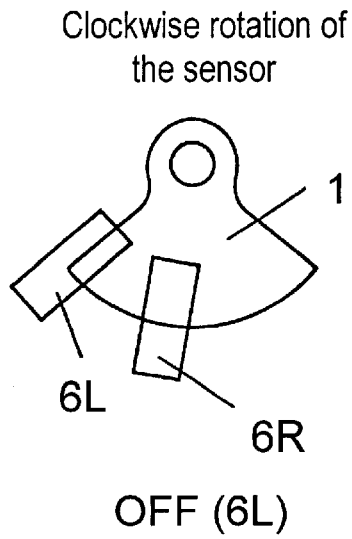
FIGS. 3A–3C are operational figures, in which two reflection type photo-interrupters are utilized in the same exemplary embodiment.
Figure 3B:
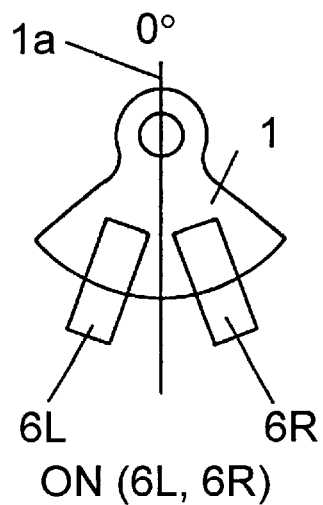
Figure 3C:
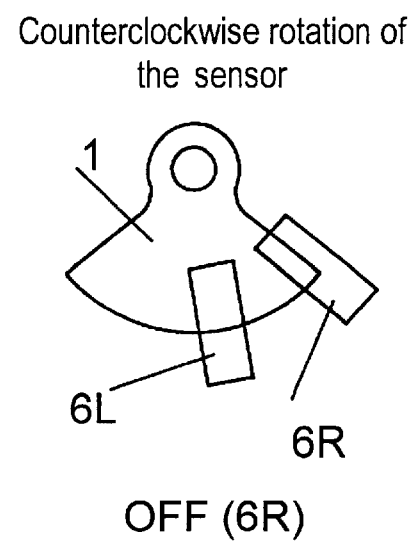
Figure 3D:
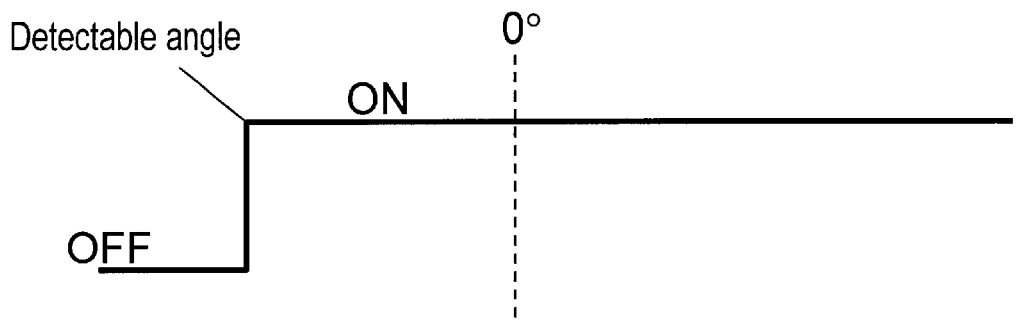
FIGS. 3D and 3E are figures depicting output waveforms of the same exemplary embodiment.
Figure 3E:
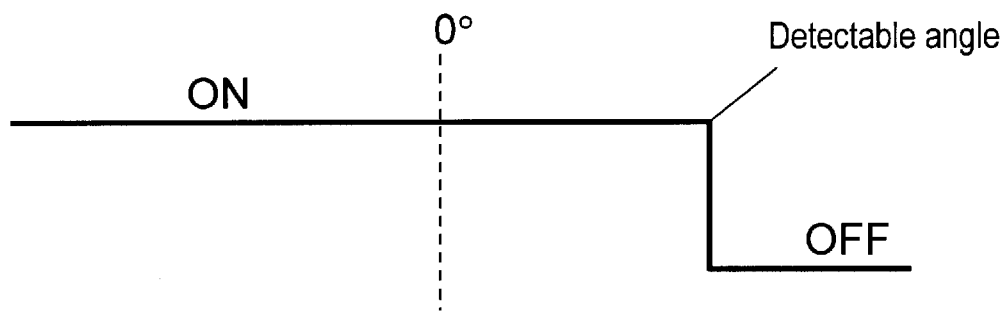

In addition, FIGS. 3A–3E show a positional relation, an operating mode and a waveform when the sensor is provided with the weight 1 and two of the reflection type photo-interrupters 6 in order to determine a rotational direction of the object being measured of an inclination angle. When the inclination angle sensor is in a state of being kept level horizontal in its entirety, for instance, the symmetrical axis 1a of the sector-shaped surface of the weight 1 orients in the gravitational direction, and it coincides with a center between the two reflection type photo-interrupters 6L and 6R, in the same way as the one shown in FIG. 2B. This state represents an inclination angle of 0°, so that both of the two reflection type photo-interrupters 6L and 6R are in an on state (ON) with light reflected by the sector-shaped surface of the weight 1. Also, when the inclination angle sensor is in a rotated state to either counterclockwise or clockwise in its entirety along with the measuring object (inclined state), the symmetrical axis of the sector-shaped surface of the weight 1 still remains in the gravitational direction. When the inclination angle sensor is rotated in its entirety to the counterclockwise direction, however, the reflection type photo-interrupter 6R is in an on state (ON) as the light is reflected by the sector-shaped surface of the weight 1, and the reflection type photo-interrupter 6L turns into an unreflected state (OFF) from the reflected state (ON) of light by the sector-shaped surface of the weight 1, as shown in FIG. 3A. If the inclination angle sensor is rotated in its entirety to the clockwise direction, on the contrary, the reflection type photo-interrupter 6L is in an on state (ON) as the light is reflected by the sector-shaped surface of the weight 1, and the reflection type photo-interrupter 6R turns into an unreflected state (OFF) from the reflected state (ON) of light by the sector-shaped surface of the weight 1, as shown in FIG. 3C. The inclination angle sensor thus becomes capable of determining a rotational direction in this manner.

Second Exemplary Embodiment

Figure 4A:
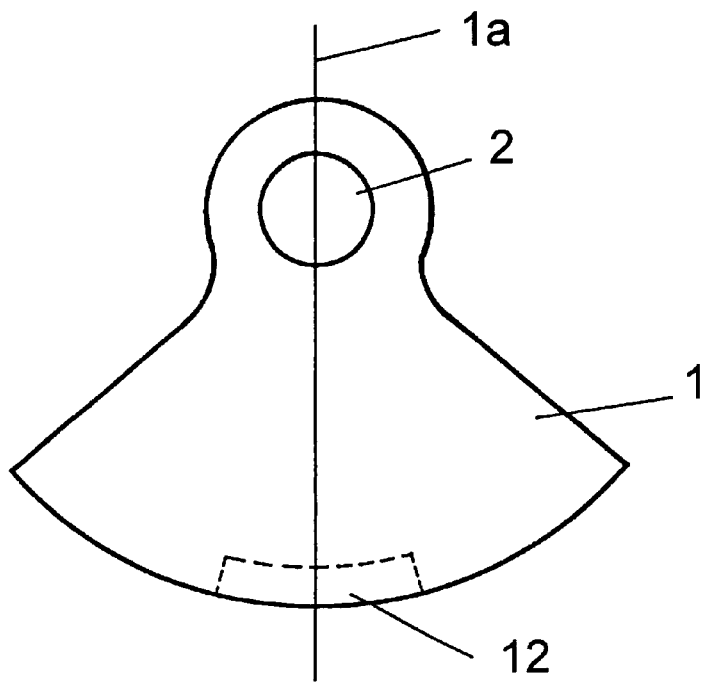
FIG. 4A is a front view of a weight for help in describing a second exemplary embodiment of the present invention.
Figure 4B:
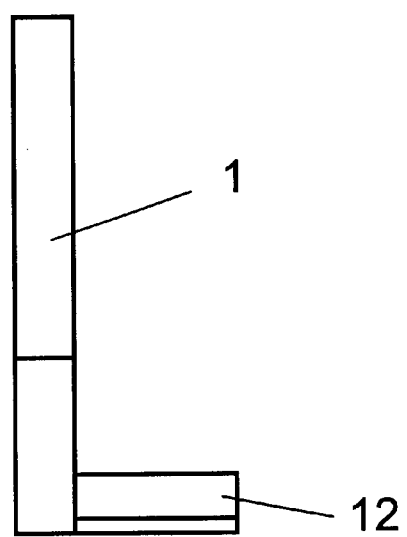
FIG. 4B is a side view of the same weight.

FIG. 4A shows a front view of a weight for help in describing an inclination angle sensor of a second exemplary embodiment of the present invention, and FIG. 4B shows a side view of the same weight. In FIGS. 4A and 4B, all components having the same structure as those of FIGS. 1A and 1B are assigned with the same reference numerals, and detailed descriptions of them are omitted. Description will be made hereinafter for only different components. In FIGS. 4A and 4B, an outer perimeter of a weight 1 is provided with a flange part 12, which outstretches 5 mm in a direction parallel to the rotary shaft 2, and that they shape like a letter L in cross-section. The flange part 12 is provided only in vicinity of a symmetrical axis 1a with the axis as the center of a sector-shaped surface of the weight 1 along a circumferential direction. The foregoing structure operates generally in the same manner as the one shown in FIGS. 2A–2D and FIGS. 3A–3D. However, a magnetic flux generated by the magnet 8 concentrates toward the flange part 12, since the flange part 12 is provided only in vicinity of the symmetrical axis 1a with the axis as the center. A damping force due to eddy current is therefore effective only in an area vicinity of the symmetrical axis 1a with the axis as the center in the sector-shaped surface of the weight 1, but it does not extend over other area. The foregoing structure can assure a stable operation with an effective damping force against angular variations of small magnitude generated during a normal traveling of an automobile, while it can also realize an instantaneous response without an effect of the damping force in detecting a large operational angle such as a turning-over.

Third Exemplary Embodiment

Figure 5A:
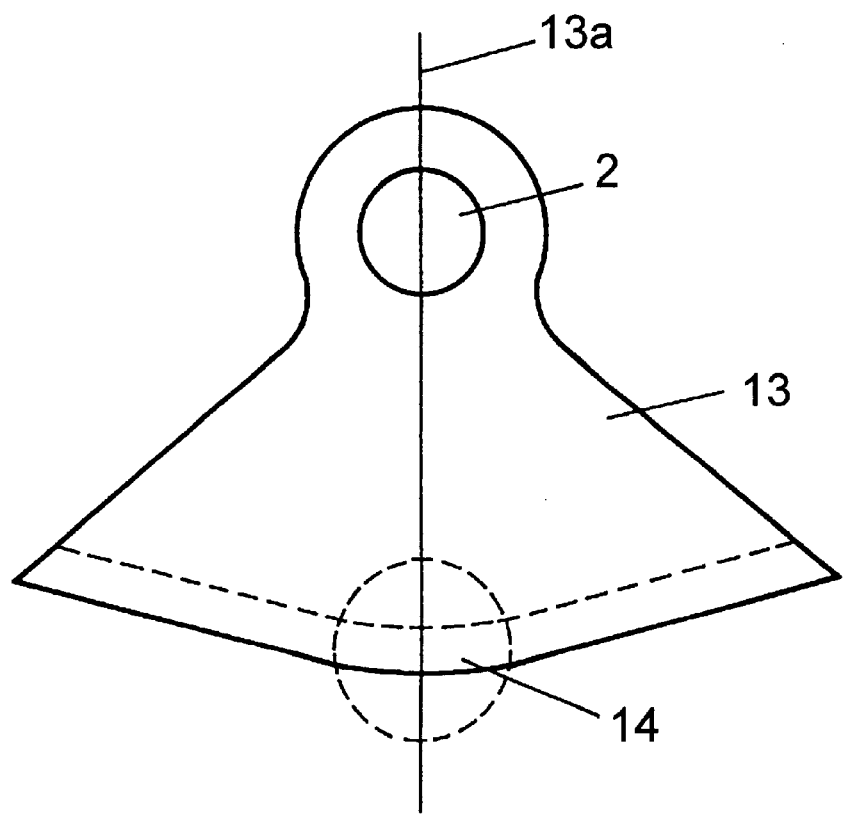
FIG. 5A is a front view of a weight for help in describing a third exemplary embodiment of the present invention.
Figure 5B:
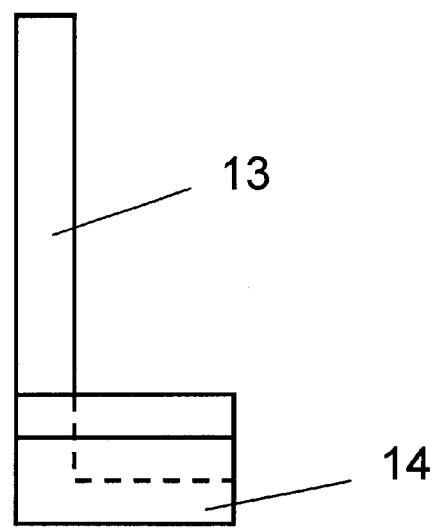
FIG. 5B is a side view of the same weight.

FIG. 5A shows a front view of a weight for help in describing an inclination angle sensor of a third exemplary embodiment of the present invention, and FIG. 5B shows a side view of the same weight. In FIGS. 5A and 5B, all components having the same structure as those of FIGS. 1A and 1B are assigned with the same reference numerals, and detailed descriptions of them are omitted. Description will be made hereinafter for only different components. In FIGS. 5A and 5B, an outer perimeter of a weight 13 is provided with a flange part 14, which outstretches 5 mm in a direction parallel to the rotary shaft 2, and that they shape like a letter L in cross-section. In addition, they have such structure that a radius of the outer perimeter of the weight 13 increases gradually with a distance from a symmetrical axis 13a of a sector-shaped surface of the weight 13. Also, an inner radius of curvature of the flange part 14 increases gradually with a distance from the symmetrical axis 13a. The foregoing structure operates generally in the same manner as the one shown in FIGS. 2A–2D and FIGS. 3A–3D. On the other hand, however, a magnetic flux directed from the magnet 8 toward the flange part 14 decreases gradually with a distance from the symmetrical axis 13a due to the structure that the inner radius of curvature of the flange part 14 increases gradually with the distance from the symmetrical axis 13a. Therefore, a damping force due to eddy current decreases gradually with the distance from the symmetrical axis 13a.

The foregoing structure can assure a stable operation with an effective damping force against angular variations of small magnitude generated during a normal traveling of an automobile, while it can also realize an instantaneous and optimum response without an effect of the damping force in detecting a large operational angle such as a turning-over.

Fourth Exemplary Embodiment

Figure 6A:
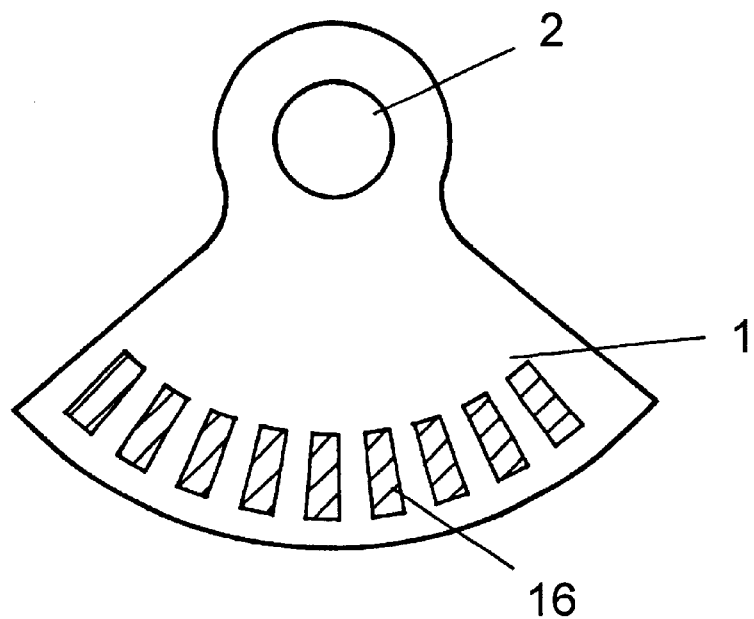
FIG. 6A is a front view of a weight for help in describing a fourth exemplary embodiment of the present invention.
Figure 6B:
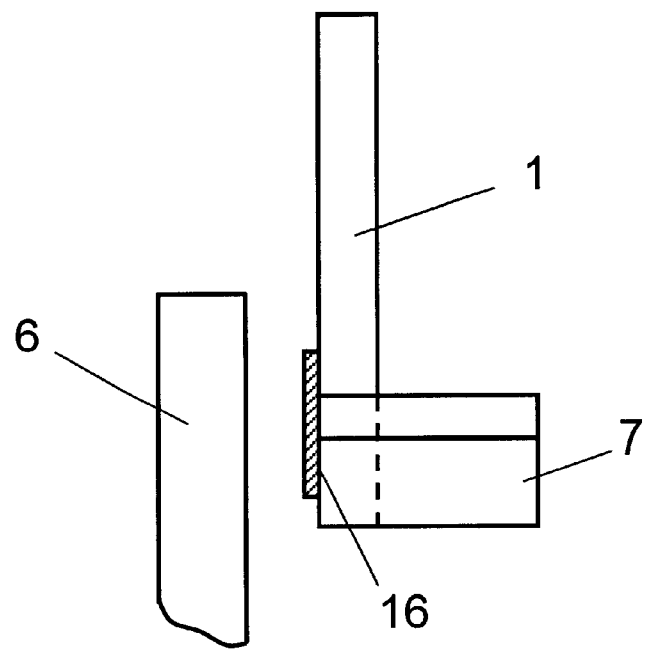
FIG. 6B is a side view of the same weight.

FIG. 6A shows a front view of a weight for help in describing an inclination angle sensor of a fourth exemplary embodiment of the present invention, and FIG. 6B shows a side view of the same weight. In FIGS. 6A and 6B, all components having the same structure as those of FIGS. 1A and 1B are assigned with the same reference numerals, and detailed descriptions of them are omitted. Description will be made hereinafter for only different components. An example is shown in FIGS. 6A and 6B, in which barcode-shaped coloration 16 in black color is made on a sector-shaped surface of the weight 1. The reflection type photo-interrupter 6 is arranged in a manner to confront the barcode-shaped coloration 16.

In this structure, the reflection type photo-interrupter 6 is in an off state (OFF) when it faces against the barcode-shaped coloration 16 because the light is not reflected, but it is in an on state (ON) when it faces with other surface because the light is reflected.

The foregoing structure allows a setting of ON and OFF freely at any angle other than the two sides of the sector-shaped surface of the weight 1, thereby enabling detection of two or more points. Because a detection angle is determined by a sectorial angle "θ" of the sector shape, a change in the detection angle also shifts a center of gravity of the weight 1, so as to affects a rotational performance under the normal condition. However, the structure shown in this exemplary embodiment is capable of adapting for any detection angle by an arrangement of the barcode-shaped coloration 16 without altering a characteristic of the weight 1. Although the present exemplary embodiment is an example in which the barcode-shaped coloration has been described as black color, this is not necessarily restrictive, and the coloration can be of any color in dark tone.

Fifth Exemplary Embodiment

Figure 7A:
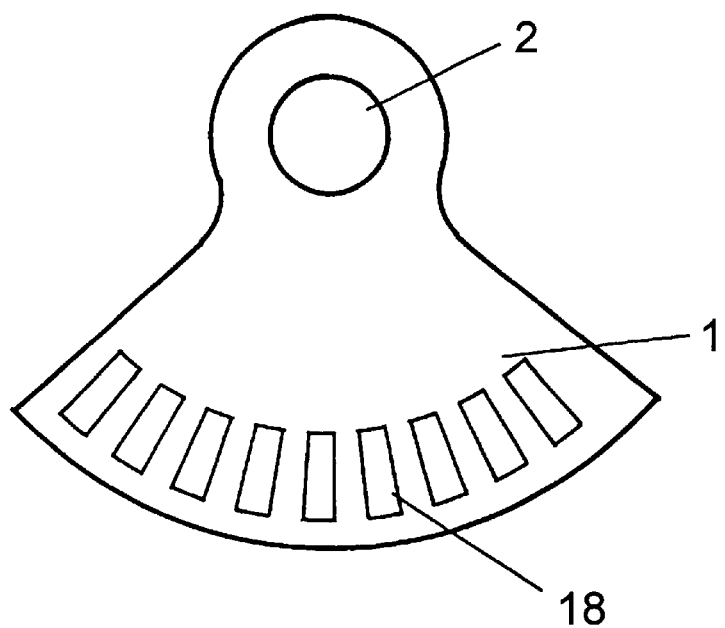
FIG. 7A is a front view of a weight for help in describing a fifth exemplary embodiment of the present invention.
Figure 7B:
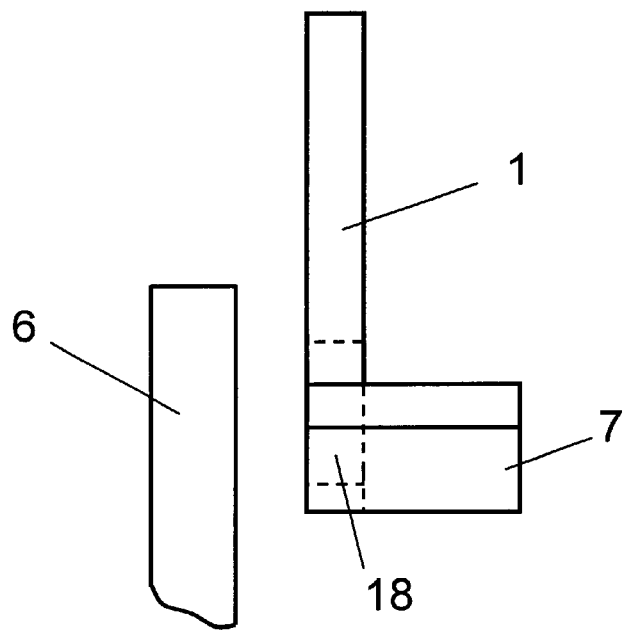
FIG. 7B is a side view of the same weight.

FIG. 7A shows a front view of a weight for help in describing an inclination angle sensor of a fifth exemplary embodiment of the present invention, and FIG. 7B shows a side view of the same weight. In FIGS. 7A and 7B, all components having the same structure as those of FIGS. 1A and 1B are assigned with the same reference numerals, and detailed descriptions of them are omitted. Description will be made hereinafter for only different components. In FIGS. 7A and 7B, through-hole slits 18 are provided in a sector-shaped surface of the weight 1.

In this structure, the reflection type photo-interrupter 6 goes off (OFF) when it faces against the through-hole slit 18 generally because the light is not reflected, but it goes on (ON) when it faces with other surface because the light is reflected.

The foregoing structure allows a setting of ON and OFF freely at any angle other than the two sides of the sector-shaped surface of the weight 1, thereby enabling detection of two or more points.

Sixth Exemplary Embodiment

Figure 8:
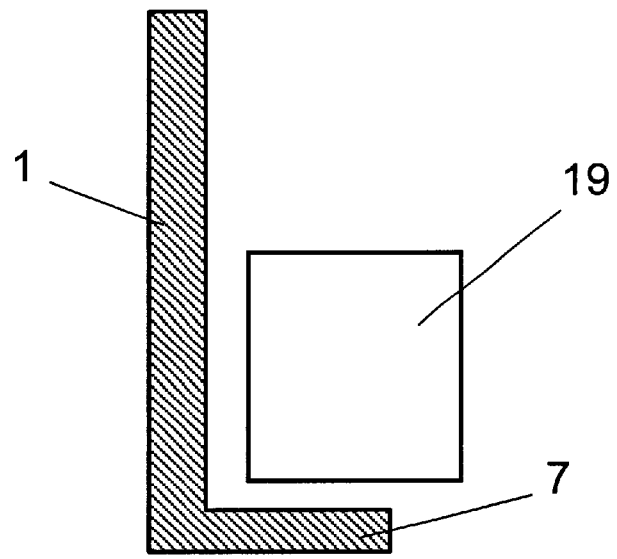
FIG. 8 is a partial cross-sectional view for help in describing a sixth exemplary embodiment of the present invention.

FIG. 8 shows a partial cross-sectional view for help in describing an inclination angle sensor of a sixth exemplary embodiment of the present invention. In FIG. 8, all components having the same structure as those of FIGS. 1A and 1B are assigned with the same reference numerals, and detailed descriptions of them are omitted. Description will be made hereinafter for only different components. In FIG. 8, 19 represents a magnet of a samarium-cobalt system.

Since the magnet of a samarium-cobalt system material is quite stable in a magnetic characteristic to temperature, it can lessen a variation of the damping force due to eddy current against a change in ambient temperature. Although the present exemplary embodiment is an example in which the magnet of a samarium-cobalt system material is used, a rare-earth magnet of other kind can be used. Or, a ferrite magnet can also be used, although it is relatively inferior in its magnetic characteristic to temperature. It is also needless to mention that an electromagnet can be used in order to gain a damping force by eddy current.

Seventh Exemplary Embodiment

Figure 9A:
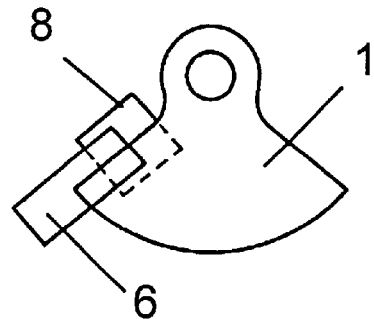
FIG. 9A is a front view of a weight for help in describing a seventh exemplary embodiment of the present invention.
Figure 9B:
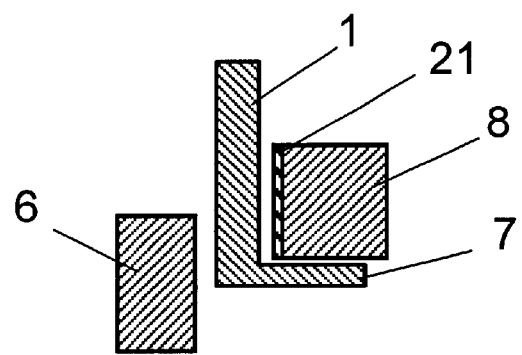
FIG. 9B is a partial cross-sectional view of the same weight.
Figure 21:
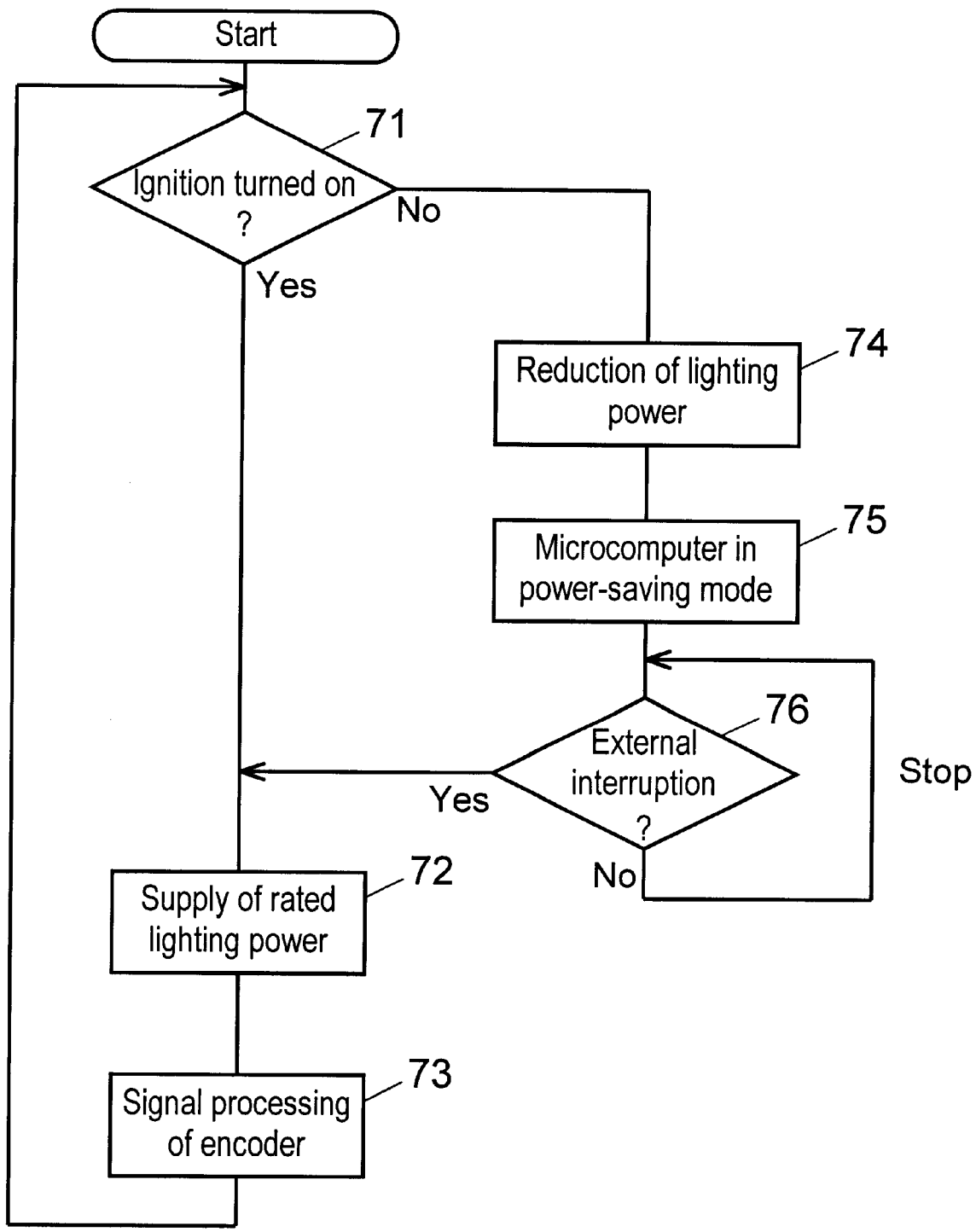
FIG. 21 is a flowchart of a microcomputer in the same sensor.

FIG. 9A shows a front view for help in describing an inclination angle sensor of a seventh exemplary embodiment of the present invention, and FIG. 9B shows a partial cross-sectional view of the same. In FIGS. 9A and 9B, all components having the same structure as those of FIGS. 1A and 1B are assigned with the same reference numerals, and detailed descriptions of them are omitted. Description will be made hereinafter for only different components. In FIGS. 9A and 9B, 21 represents a black body provided for a purpose of suppressing a reflection of light from surface of a magnet 8. There are cases that the reflection type photo-interrupter 6 malfunctions at a boundary, where a change takes place from a reflecting state (ON) to a non-reflecting state (OFF) of light, in a positional relation that the reflection type photo-interrupter 6 faces against the two sides of the sector-shaped surface of the weight 1. However, placement of the black body on a lustrous metallic surface of the magnet 8 in a manner not to reflect the light can avoid the malfunction. Although the present exemplary embodiment is an example in which the black body is placed, this is not necessarily restrictive, and it can be replaced with coloration of dark tone.

Eighth Exemplary Embodiment

Figure 10A:
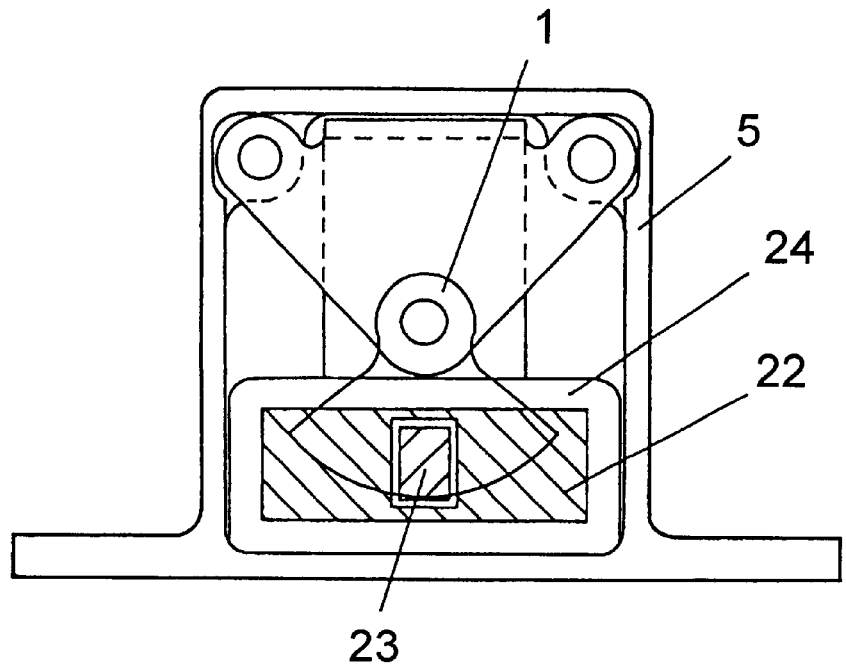
FIG. 10A is a structural view for help in describing an eighth exemplary embodiment of the present invention.
Figure 10B:
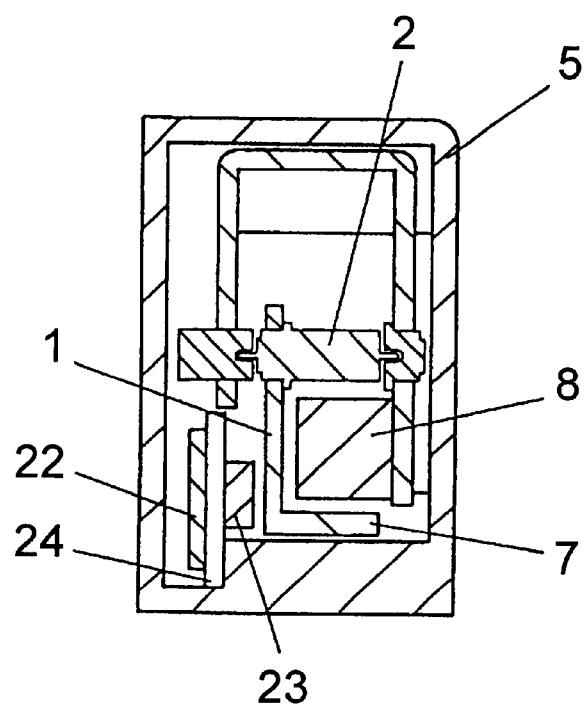
FIG. 10B is a cross-sectional view of the same exemplary embodiment.
Figure 22:
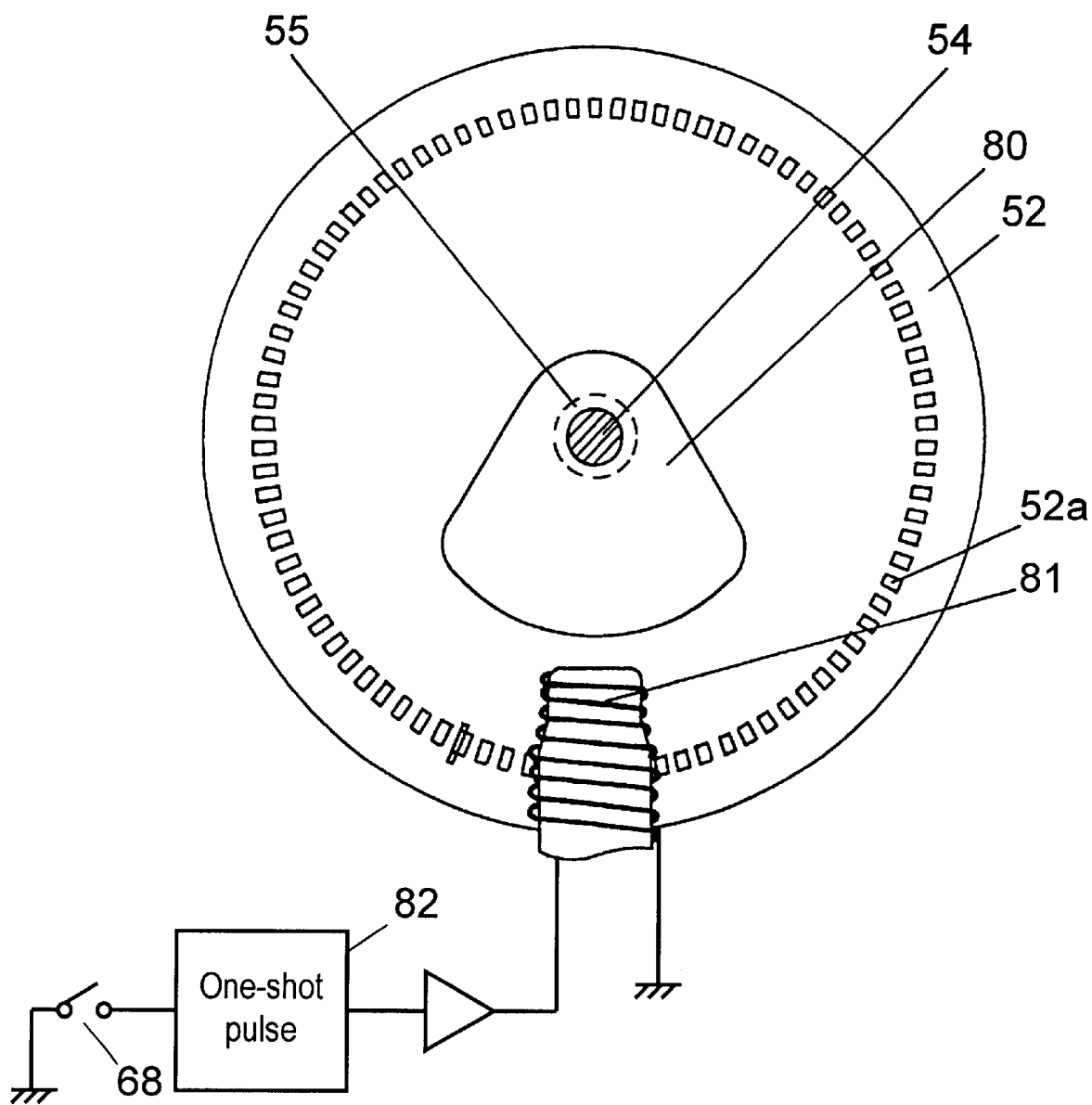
FIG. 22 is a structural view depicting an inclination angle sensor of an eighteenth exemplary embodiment of the present invention.

FIG. 10A shows a structure drawing for help in describing an inclination angle sensor of an eighth exemplary embodiment of the present invention, and FIG. 10B shows a cross-sectional view of the same. In FIG. 10A and 10B, all components having the same structure as those of FIGS. 1A and 1B are assigned with the same reference numerals, and detailed descriptions of them are omitted. Description will be made hereinafter for only different components. In FIG. 10A and 10B, 22 represents a circuit unit for processing a signal, 23 represents a reflection type photo-interrupter, and 24 represents a printed wiring board. The reflection type photo-interrupter 23 and the circuit unit 22 for signal processing are mounted on the same printed wiring board 24. The reflection type photo-interrupter 23 is fixed to a case 5 in a manner that a detecting surface of the photo-interrupter 23 and a sector-shaped surface of a weight 1 are in parallel, and with a predetermined space against each other.

Accordingly, the reflection type photo-interrupter 23 and the circuit unit 22 for signal processing are mounted on the same printed wiring board 24, so as to enable a reduction in size. Also, since the case 5 is provided with a subsided portion for easy and precise mounting of the printed wiring board 24, the reflection type photo-interrupter 23 can be readily positioned in a manner to keep the detecting surface of it and the sector-shaped surface of the weight 1 in parallel, with the predetermined space against each other. It is to be noted, however, that the detecting surface of the photo-interrupter 23 and the sector-shaped surface of the weight 1 need not be strictly in parallel with each other.

Ninth Exemplary Embodiment

Figure 11:
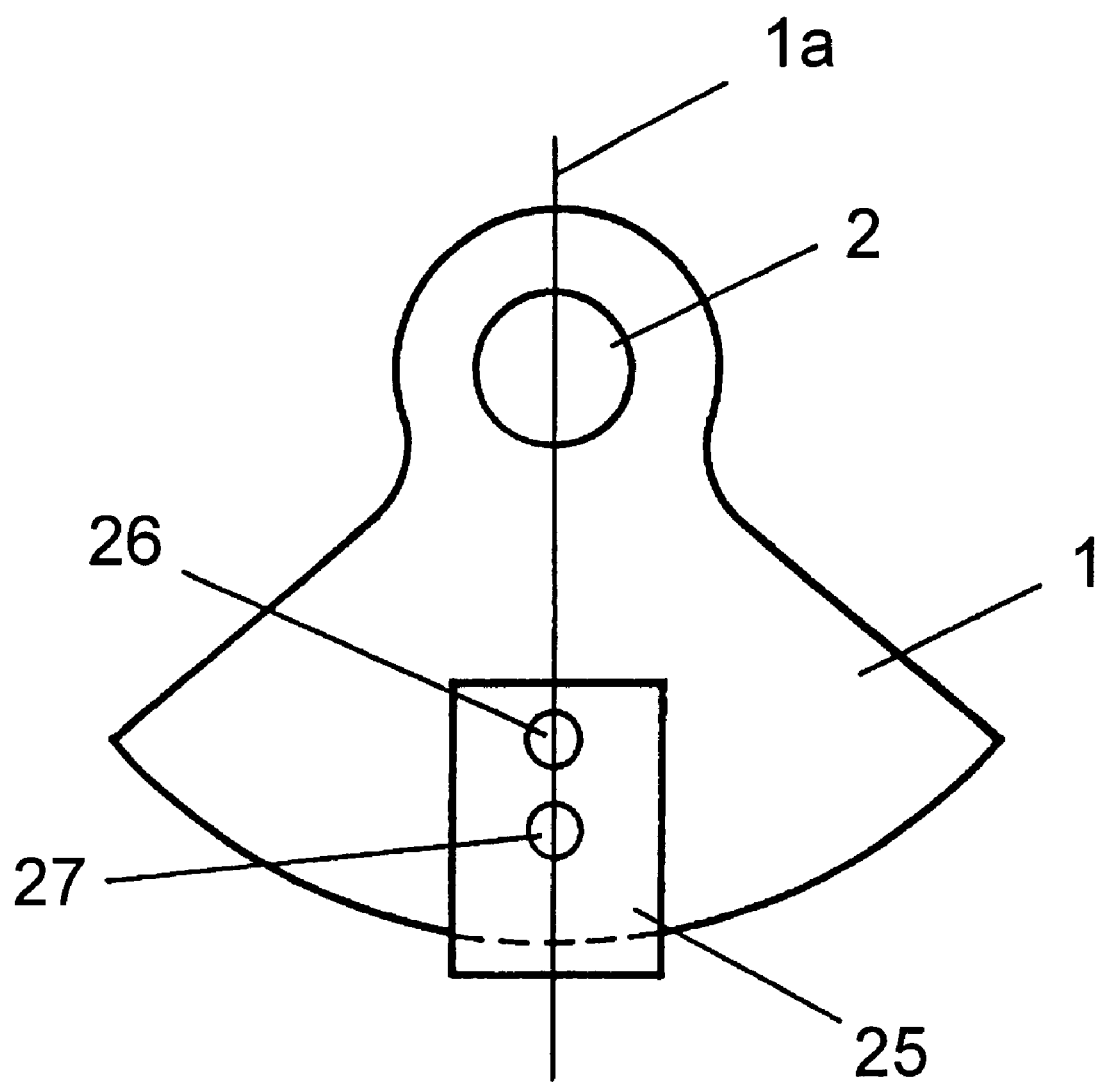
FIG. 11 is a front view for help in describing a ninth exemplary embodiment of the present invention.

FIG. 11 shows a front view for help in describing an inclination angle sensor of a ninth exemplary embodiment of the present invention. In FIG. 11, all components having the same structure as those of FIGS. 1A and 1B are assigned with the same reference numerals, and detailed descriptions of them are omitted. Description will be made hereinafter for only different components. In FIG. 11, 25 represents a reflection type photo-interrupter, and 26 and 27 respectively represent a light-emitting element and a light-receiving element of the photo-interrupter 25. Both elements are aligned generally in line with a radial direction of a rotary shaft 2. In a word, it means that a symmetrical axis 1a of a sector-shaped surface of a weight 1 and a line between the light-emitting element 26 and the light-receiving element 27 generally coincide with each other, when the inclination angle sensor is installed in a horizontal level. A degree of this coincidence can be such that they are approximately in line, and that they need not be precisely aligned.

The foregoing structure can lessen a detecting error of angle for the reflection type photo-interrupter 25, and improve an accuracy of detection.

Tenth Exemplary Embodiment

Figure 12:
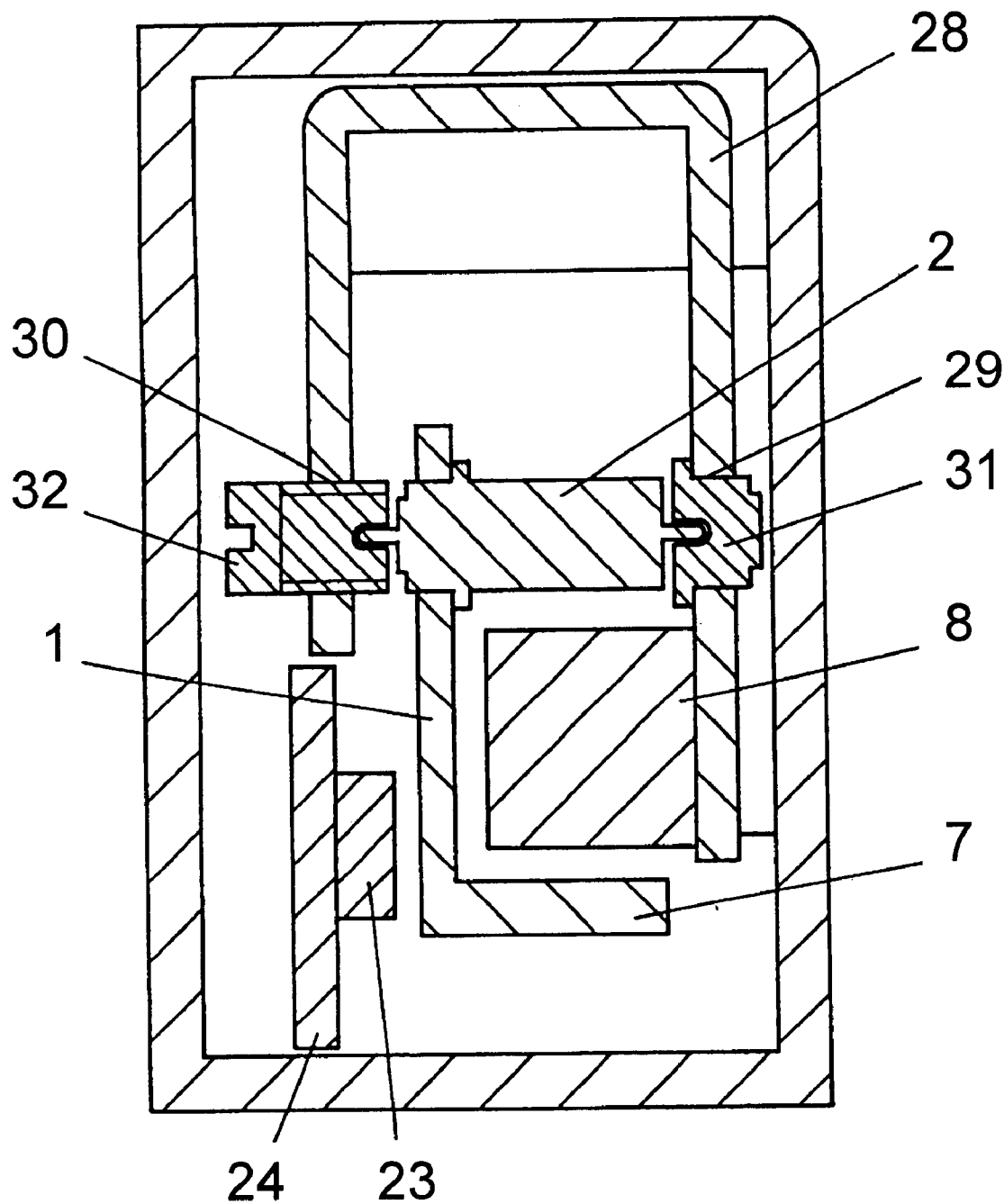
FIG. 12 is a cross-sectional view for help in describing a tenth exemplary embodiment of the present invention.

FIG. 12 shows a cross-sectional view for help in describing an inclination angle sensor of a tenth exemplary embodiment of the present invention. In FIG. 12, all components having the same structure as those of FIGS. 1A and 1B are assigned with the same reference numerals, and detailed descriptions of them are omitted. Description will be made hereinafter for only different components. In FIG. 12, 28 represents a plate-like frame in a shape of letter U, and 29 and 30 represent bearing mounting holes provided coaxially in each of two generally paralleled surfaces of the frame 28. 31 represents a bearing made of oil-impregnated alloy secured in the bearing mounting hole 29, and 32 represents a bearing made of oil-impregnated alloy, a circumferential surface of which is formed with a male thread in advance so as to allow adjustment and securement by screwing it in the bearing mounting hole 30 having a female thread.

The foregoing structure allows a rotary shaft 2 to be fastened without looseness at an optimum thrusting force, so as to make a weight 1 to rotate smoothly with no backlash.

Eleventh Exemplary Embodiment

Figure 13:
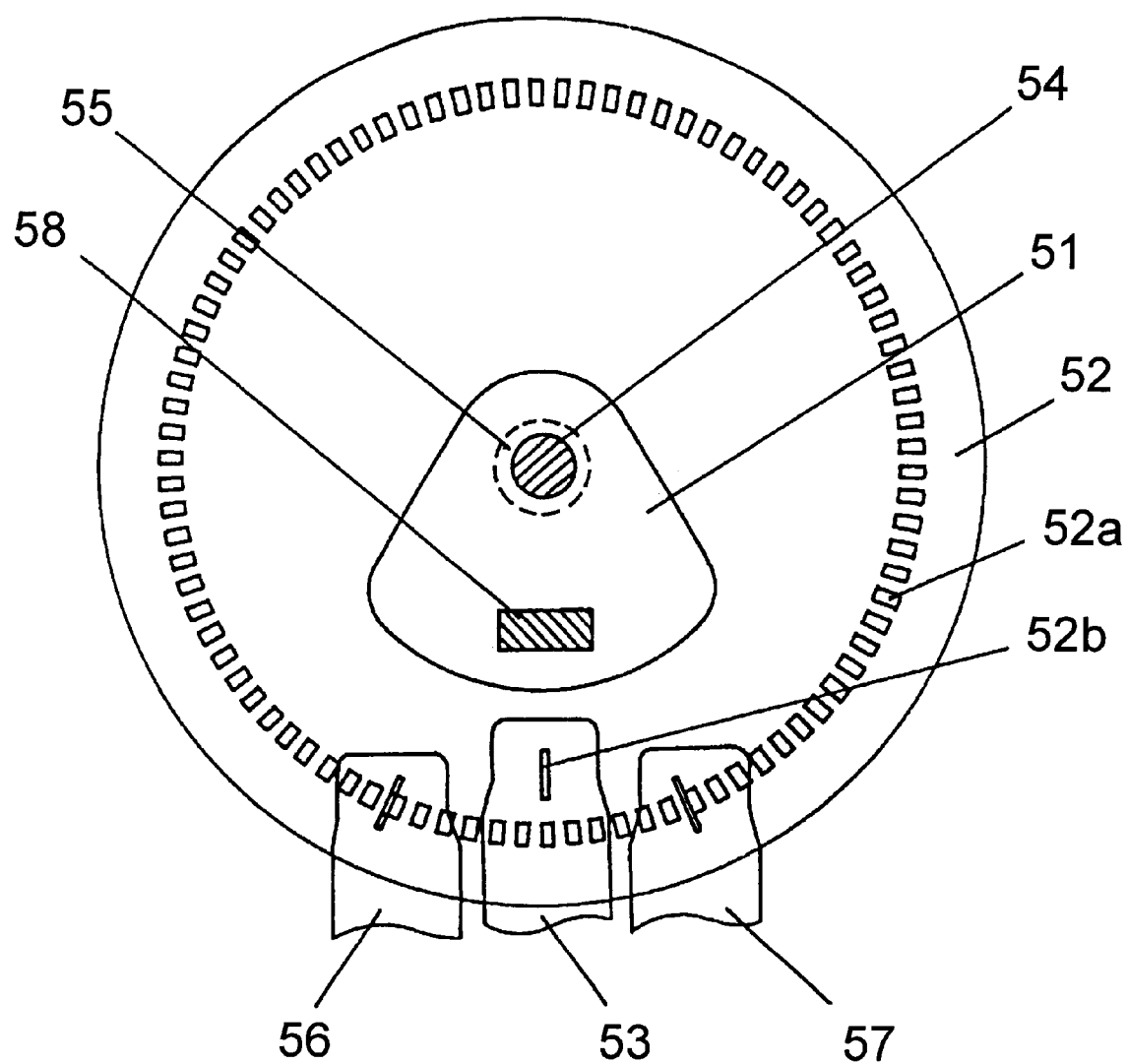
FIG. 13 is a front view depicting an inclination angle sensor of an eleventh exemplary embodiment of the present invention.

FIG. 13 shows a structure of an inclination angle sensor of an eleventh exemplary embodiment of the present invention. In FIG. 13, 51 represents a weight made of material having a superior conductivity such as copper and the like. 52 represents a thin slit plate to which the weight 51 is fixed. The slit plate 52 is perforated with a "N" number of equally spaced angle detection slits 52a at intervals of θ° along a circumferential direction, and only one zero detection slit 52b for an indication of vertical direction in only one position corresponding to a photo-interrupter 53 at a different radial distance from the slit 52a. 54 represents a rotary shaft, about which the weight 51 and the slit plate 52 can rotate freely. The photo-interrupter 53 consisting of mutually confronting light-emitting element and light-receiving element is fixed with respect to a bearing 55 of the rotary shaft 54 in a such position that light is transmitted through the zero detection slit 52b of the slit plate 52 when the inclination angle sensor is placed at 0° with respect to the vertical direction, and the light is shielded by the slit plate 52 when the inclination angle sensor is placed otherwise. 56 and 57 also represent photo-interrupters fixed with respect to the bearing 55 in such positions where light is transmitted or shielded by the angle detection slits 52a in the circumferential direction of the slit plate 52, and where they are shifted from each other for 90° of an emerging cycle of the angle detection slits 52a. 58 represents a magnet defining an eddy current damping means, which is fixed with respect to the bearing 55 in a position where its magnetic flux penetrates the weight 51. In this structure, the photo-interrupters 53, 56 and 57 in combination with the slit plate 52 having slits 52a and 52b constitute optical encoders.

Since the weight 51 and the magnet 58 can constitute an eddy current damping mechanism, the structure can be composed of a weight 51 made of magnet and a conductive member in place of the magnet 58.

Figure 14A:
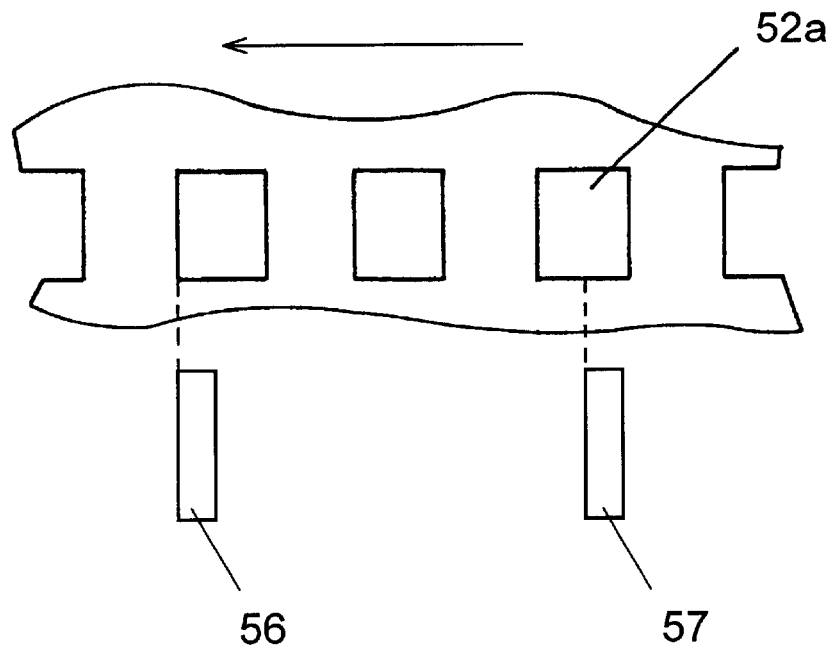
FIG. 14A is a view showing a positional relationship between a photo-interrupter and slits of the same sensor.
Figure 14B:
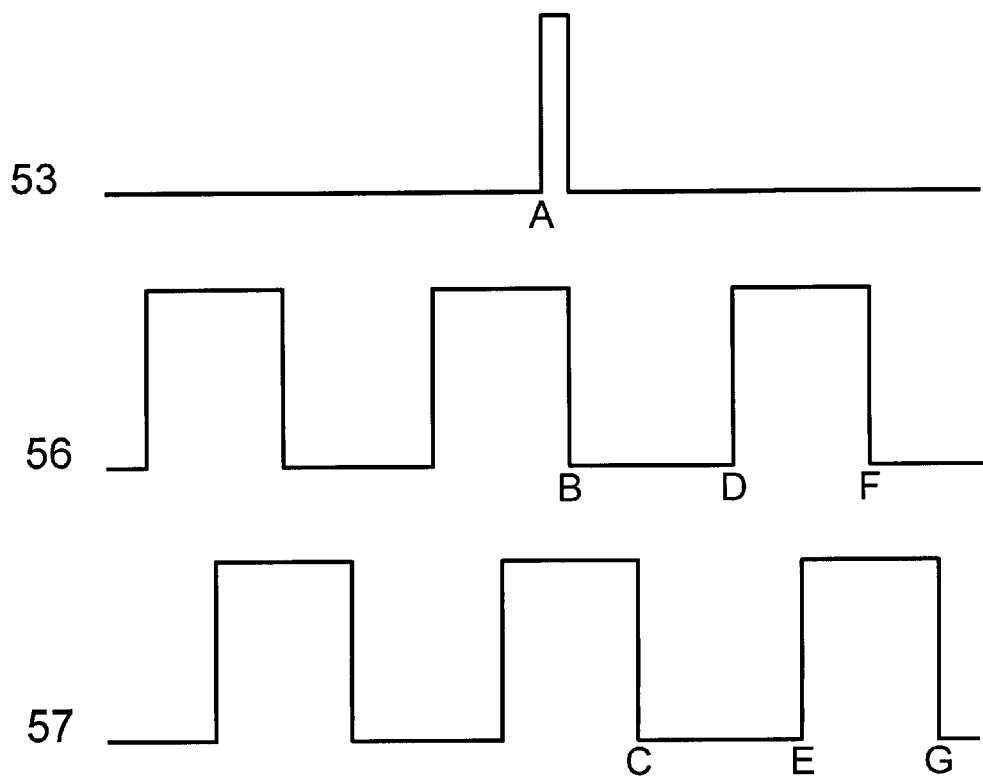
FIG. 14B is a view depicting an output waveform of the same photo-interrupter.

The foregoing components operate in a manner as described hereinafter. The bearing 55 is fixed with respect to an object being measured, so that the weight 51 orients toward the gravitational direction. Therefore, if the object being measured is inclined about the rotary shaft 54, the weight 51 and the slit plate 52 rotate in the same angle of inclination with respect to the bearing 55. As the photo-interrupters 53, 56 and 57 pass by the slits of the slit plate 52 during this motion, their light-receiving elements output ON and OFF signals. Output waveform from each of the photo-interrupters is shown in FIG. 14A and 14B, when rotated counterclockwise past the 0° position. FIG. 14A shows a precise positional relation between the angle detection slits 52a and the photo-interrupters 56 and 57. FIG. 14B shows their waveforms. It is assumed here that a rotational direction is counterclockwise if a change in edge appears first in the photo-interrupter 56, and clockwise if it appears first in the photo-interrupter 57. FIG. 14A and 14B represents a counterclockwise rotation. In FIG. 14A and 14B, a signal of 0° appears at point A in a rising edge of the photo-interrupter 53, and changes of edge from the photo-interrupters 56 and 57 are counted at this point of time. A change of edge B from the photo-interrupter 56 is counted as +1 by assigning the counterclockwise a positive direction. A change in edge C from the photo-interrupter 57 is counted next as +2, and counting is continued thereafter for changes in edge, D, E, F and G, in the same manner. Accordingly, a change in angle from 0° can be measured digitally with a formula of $(\theta \times n/4)°$, in which "n" denotes a number of counting. In this instance, a spaced angle between the slits 52a is 4°.

In addition, when the slit plate 52 rotates, the rotation is suppressed due to an effect of electromagnetic damping force by an interaction between the weight 51 and the magnet 58 in proportion to a rotational velocity. This force can suppress an effect of external disturbance due to vibrations, etc.

The foregoing structure can achieve high resolution by obtaining a resolution level of θ/4 in spite of a mechanical resolution of θ.

Twelfth Exemplary Embodiment

Figure 15:
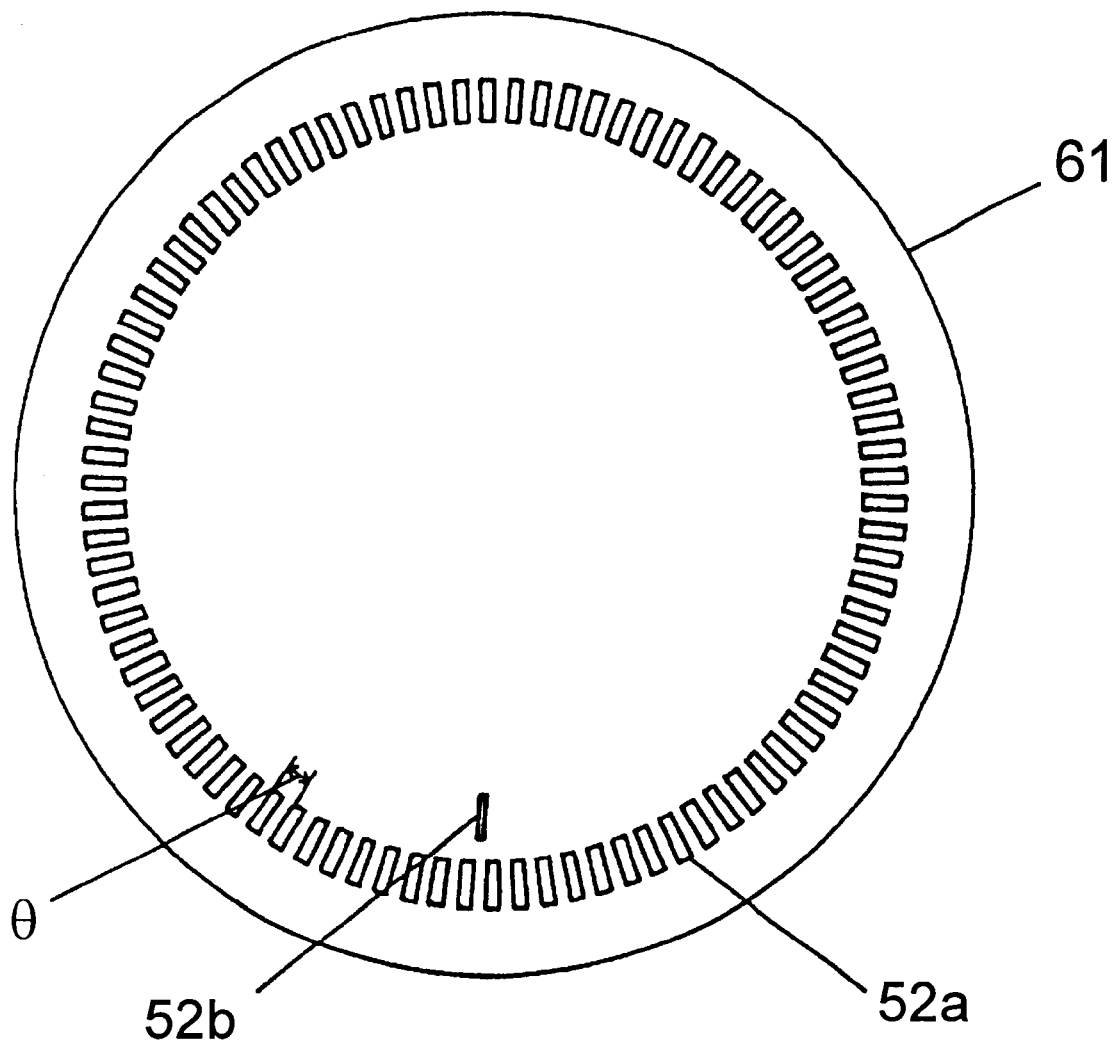
FIG. 15 is a plan view depicting a slit plate of a twelfth exemplary embodiment of the present invention.

FIG. 15 shows a shape of a slit plate of an inclination angle sensor of a twelfth exemplary embodiment of the present invention. The slit plate 61 has a circular shape, and a weight 51 (not shown in the figure) is attached. The slit plate 61 is perforated with "360/θ" number of equally spaced angle detection slits 52a around an entire circumference of it at intervals of θ° along the circumferential direction, and also a zero detection slit 52b for an indication of vertical direction in only one position at a different radial distance from the slits 52a. Description of other components is omitted, as they are identical to those of the eleventh exemplary embodiment shown in FIG. 13.

Since the inclination angle sensor of the foregoing structure operates in a manner similar to that described in the eleventh exemplary embodiment, it will not be described. However, because the inclination angle sensor is capable of detecting the angle detection slits 52a for a range of 360°, it can detect an angle accurately for multiple rotations beyond 360°. In addition, it can detect an absolute angle of less than 360° by detecting the zero detection slit 52b, when it rotates 360° where it resets a number of counting the angle to 0.

The inclination angle sensor can be thus utilized for detecting an angle of multiple rotation beyond 360° or an absolute angle of rotation in less than 360°.

Thirteenth Exemplary Embodiment

Figure 16:
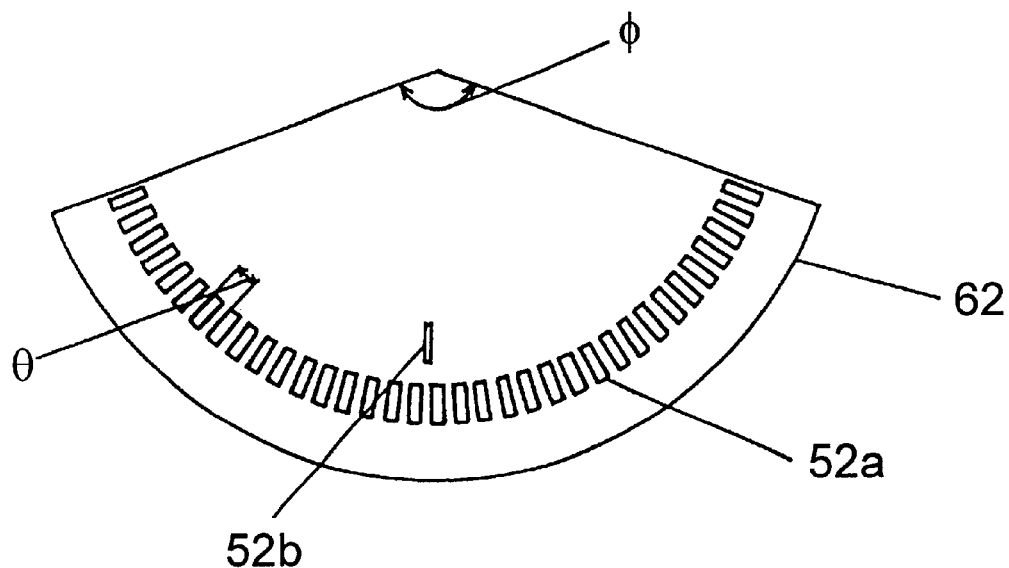
FIG. 16 is a plan view depicting a slit plate of a thirteenth exemplary embodiment of the present invention.

FIG. 16 shows a shape of a slit plate of an inclination angle sensor of a thirteenth exemplary embodiment of the present invention. The slit plate 62 has a sector shape with an interior angle of φ°, and a weight 51 (not shown in the figure) is attached. The slit plate 62 is perforated with "φ/θ" number of equally spaced angle detection slits 52a at intervals of θ° along the circumferential direction, and also a zero detection slit 52b for an indication of vertical direction in only one position at a different radial distance from the slits 52a. Description of other components is omitted, as they are identical to those of the eleventh exemplary embodiment shown in FIG. 13.

Since the inclination angle sensor of the foregoing structure operates in a manner similar to that described in the eleventh exemplary embodiment, it will not be described. However, because the angle detection slits 52a are formed only in a range of ±φ/2°, the inclination angle sensor does not renew a counting of angle for an inclination beyond that range.

If the inclination angle sensor of this structure is provided with photo-interrupters 56 and 57 in positions containing an angle of δ°, it can be utilized for detecting angle of less than ±(φ−δ) /2°, and a height of the sensor can be reduced since the slot plate 62 needs not make more than one rotation. If the photo-interrupters 56 and 57 are arranged in positions containing 30°, and the slit plate 62 has an interior angle of 90°, for instance, a range of detectable angle is ±30°. In this instance, a vertical dimension of the inclination angle sensor can be reduced to approximately ½ of the one having the structure described in the twelfth exemplary embodiment, thereby realizing a reduction in size.

Fourteenth Exemplary Embodiment

Figure 17:
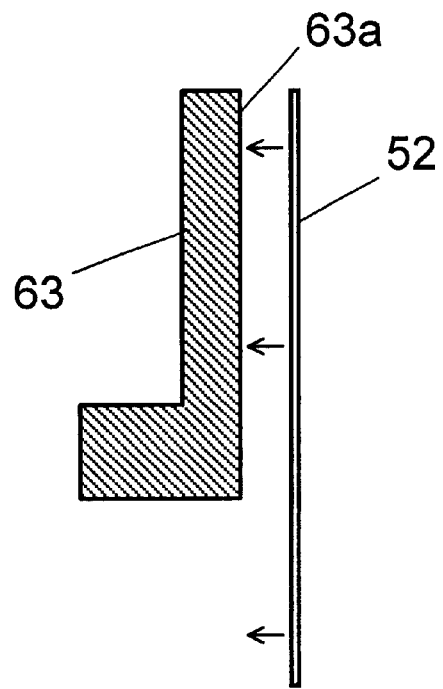
FIG. 17 is a cross-sectional view depicting a weight of an inclination angle sensor of a fourteenth exemplary embodiment of the present invention.

FIG. 17 shows a shape of a weight and a slit plate of an inclination angle sensor of a fourteenth exemplary embodiment of the present invention. The weight 63 is so formed that it has a flat surface 63a in a radial direction of a rotary shaft, and the slit plate 52 is adhesively secured to the flat surface 63a. Description of other components is omitted, as they are identical to those of the eleventh exemplary embodiment shown in FIG. 13.

Since the inclination angle sensor of the foregoing structure operates in a manner similar to that described in the eleventh exemplary embodiment, it will not be described.

This structure enables the slit plate 52 to maintain rigidness, even if its thickness is reduced. The thin slit plate 52 facilitates perforation of angle detection slits 52a and a zero detection slit 52b by means of etching or the like process. A substantial reduction of the slit plate 52 in proportion to the weight 63 also reduces a shift of the moment of inertia of the weight 63 caused by adhesion of the slit plate 52, so as to facilitate designing of an inclination angle sensor having desired characteristics such as a responsivity.

Fifteenth Exemplary Embodiment

Figure 18:
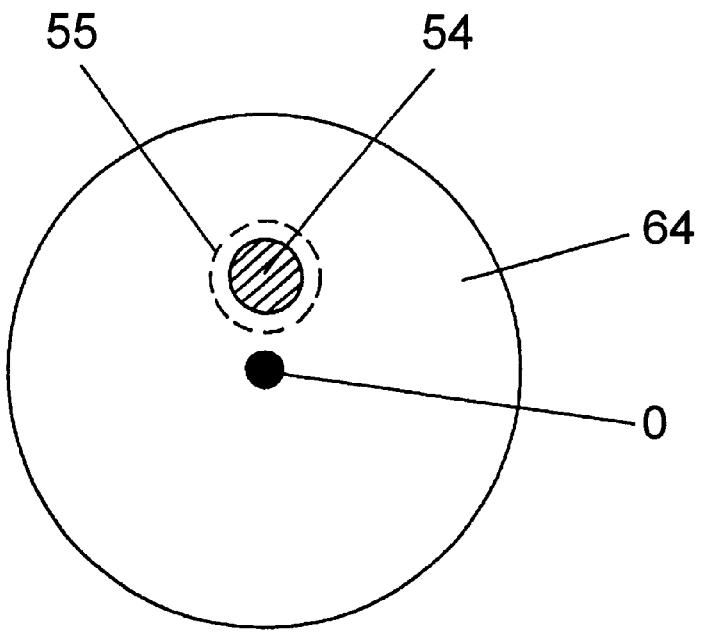
FIG. 18 is a plan view depicting a weight of an inclination angle sensor of a fifteenth exemplary embodiment of the present invention.

FIG. 18 shows a weight of an inclination angle sensor of a fifteenth exemplary embodiment of the present invention. Description of other components is omitted, as they are identical to those of the eleventh exemplary embodiment shown in FIG. 13. In FIG. 18, 64 represents the weight, which is characterized by having a center of gravity 0 in vicinity of a rotary shaft 54.

Although the inclination angle sensor of the foregoing structure operates in a manner similar to that described in the eleventh exemplary embodiment, it reduces a torque that affects around the rotary shaft 54 for rotating the weight 64, when an acceleration is applied to the weight 64 in a direction of the rotary shaft 54 and a direction perpendicular to the vertical direction because of a short distance between the center of gravity 0 of the weight 64 and the rotary shaft 54. Therefore, it can measure inclination angle accurately with a lesser effect other than gravity.

The foregoing structure reduces an effect of centrifugal force if the inclination angle sensor is mounted to an automobile in a direction of rolling, and an effect of acceleration due to accelerating and decelerating of the automobile if mounted in a direction of pitching.

Sixteenth Exemplary Embodiment

Figure 19:
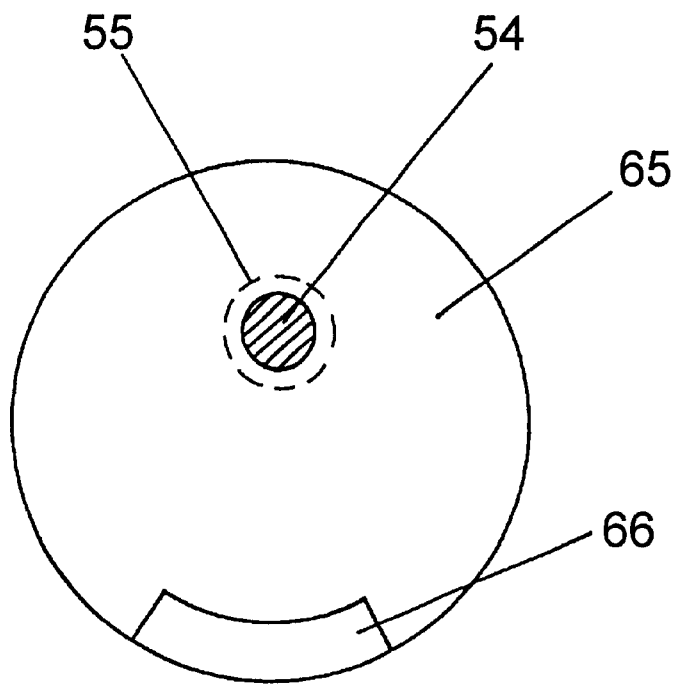
FIG. 19 is a plan view depicting a weight of an inclination angle sensor of a sixteenth exemplary embodiment of the present invention.

FIG. 19 shows a weight of an inclination angle sensor of a sixteenth exemplary embodiment of the present invention. Description of other components is omitted, as they are identical to those of the eleventh exemplary embodiment shown in FIG. 13. In FIG. 19, 65 represents the weight, which is characterized by having a damping portion 66, which interacts with a magnet 58 (not shown in the figure), only at a part in a vertically downward direction of it.

The inclination angle sensor of the foregoing structure operates in the similar manner to that described in the eleventh exemplary embodiment. However, while the slit plate 52 (not shown in the figure) receives a damping force against its rotation at the part where the damping portion 66 near 0° to the vertical direction and the magnet 58 interacts, it does not receives a damping force in other portion, thereby gaining a quick response.

The foregoing structure enables the inclination angle sensor to operate in a stable range of good damping effect for detecting a small angle for the purpose of controlling attitude of an automobile, and in a quick-responsive range of no damping effect for detecting a large moving angle such as turning-over of the automobile.

Seventeenth Exemplary Embodiment

Figure 20:
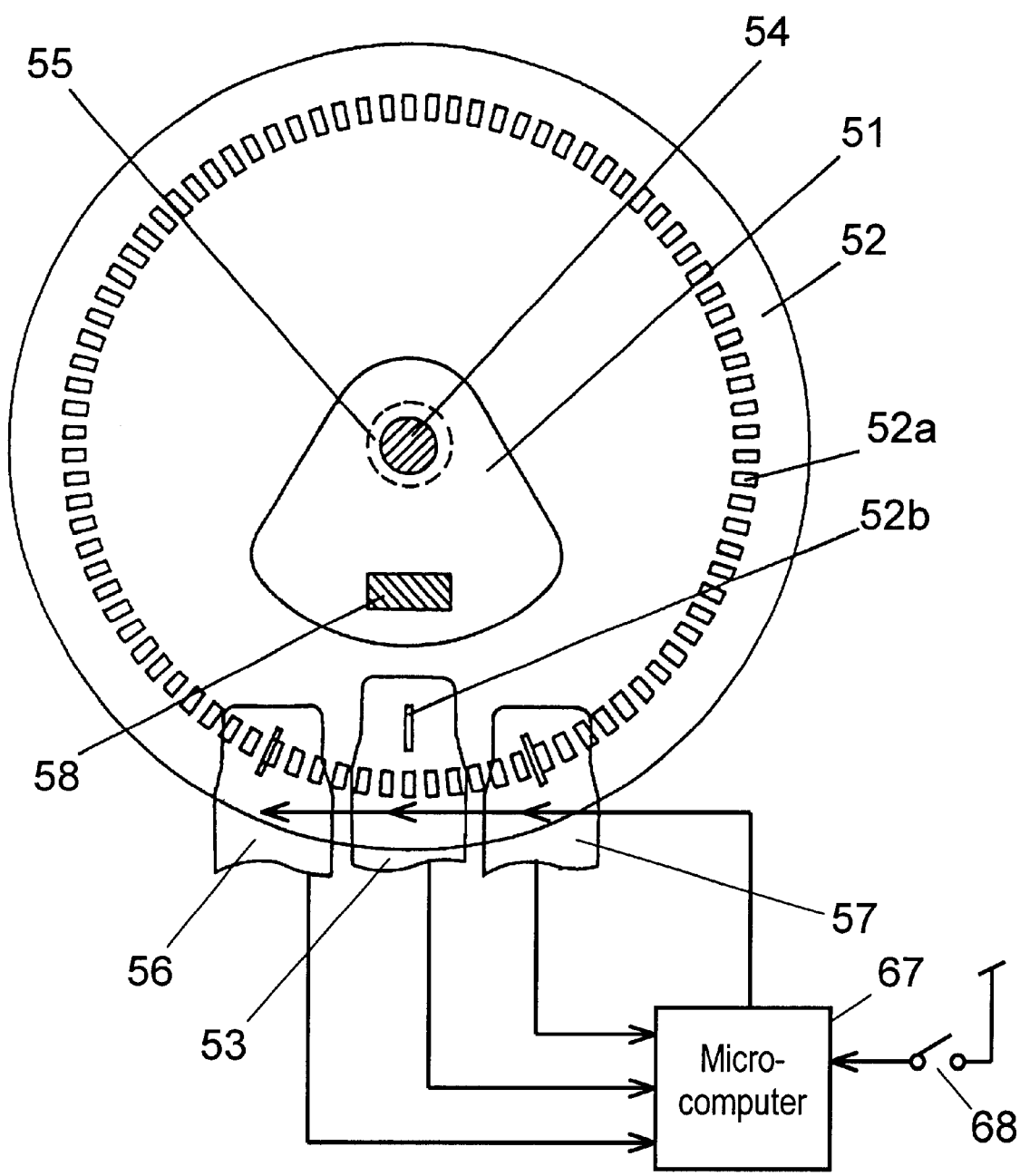
FIG. 20 is a structural view depicting an inclination angle sensor of a seventeenth exemplary embodiment of the present invention.

FIG. 20 shows an inclination angle sensor of a seventeenth exemplary embodiment of the present invention. Since it has the same structure in principle to that of the eleventh exemplary embodiment shown in FIG. 13, detailed description of the same components will be omitted. In FIG. 20, 51 represents a weight, and 52 represents a slit plate. The weight 51 and the slit plate 52 are securely attached together, and they are smoothly rotatable about a rotary shaft 54. 53, 56 and 57 represent photo-interrupters for reading slits in the slit plate 52. 58 represents a magnet defining an eddy current damping means for generating electromagnetic damping action with the weight 51. 67 represents a microcomputer defining a control means for inputting a signal of the photo-interrupters 53, 56 and 57 as well as a signal of an ignition switch 68. The microcomputer 67 has a circuit for supplying a rated power to the photo-interrupters 53, 56 and 57 when the signals are ON, and a small power when the signals are OFF.

Since the inclination angle sensor of the foregoing structure operates in the similar manner to that shown in the eleventh exemplary embodiment, a description will be made only for an operation of the microcomputer 67. FIG. 21 shows a flowchart. Basically, the microcomputer 67 is supplied with a power at all the time, so that it always checks an ON and OFF of the ignition switch 68 in step 71. When the microcomputer 67 verifies the ignition switch 68 is ON in the step 71, it supplies the rated lighting power to the photo-interrupters in step 72, and calculates an inclination angle by counting edges according to outputs from the three photo-interrupters 53, 56 and 57 in step 73. A method of calculation is same as that described in the eleventh exemplary embodiment. If the microcomputer 67 verifies the ignition switch 68 is OFF in the step 71, it reduces the lighting power to the photo-interrupters to a minimum value to sustain their operation in step 74, so that the microcomputer 67 continues to operate in an energy-saving mode in step 75. During this period, the microcomputer 67 is in a waiting mode in step 76 for a change in level from any of the three photo-interrupters 53, 56 and 57, and the ignition switch 68 as an external interrupt signal. If the microcomputer 67 receives an external interruption from any of the above elements, it starts the same operation as that when the ignition switch 68 is ON, and performs processing of an encoder signal.

With the foregoing structure, the inclination angle sensor is always able to measure accurate angle without passing through a 0° position even if the ignition switch 68 is turned on while an automobile, in which it is mounted, is in an inclined position.

Eighteenth Exemplary Embodiment

FIG. 22 shows an inclination angle sensor of an eighteenth exemplary embodiment of the present invention. Since it has the same structure in principle as that of the eleventh exemplary embodiment shown in FIG. 13, detailed description of the same components will be omitted. In FIG. 22, 80 represents a weight composed of a magnet, and 52 represents a slit plate having slits. The weight 80 and the slit plate 52 are securely attached together, and they are smoothly rotatable about a rotary shaft 54. There are three sets of photo-interrupters 53, 56 and 57 (not shown in the figure) in like manner as the eleventh exemplary embodiment for reading slits in the slit plate 52, as is needless to mention. 81 represents an electromagnet (with a core made of an electrically conductive material) defining an eddy current damping means for generating electromagnetic damping action with the weight 80. 82 represents an one-shot pulse circuit for generating a pulse signal only once at a start-up of the ignition switch 68, thereby supplying a current to an electromagnet constructed in the electromagnet 81.

Since the inclination angle sensor of the foregoing structure operates in the similar manner to that shown in the eleventh exemplary embodiment, a description will be made only for an initial operation at a moment when the ignition switch 68 is turned on. The one-shot pulse circuit 82 supplies a current to the electromagnet 81 for a predetermined period of time, when the ignition switch 68 is turned on. The electromagnet 81 produces a magnetic field in a direction of attracting the weight 80 made of a magnet during this period, so as to force the weight 80 to orient toward the electromagnet 81. The photo-interrupter 53 detects a zero detection slit 52b at this time, and a process of angle detection can begin. Same operation as that of the eleventh exemplary embodiment continues thereafter, while the current is no longer supplied to the electromagnet 81.

The foregoing structure enables the inclination angle sensor to start detecting angle at a moment the ignition switch 68 is turned on, since it detects a zero position once assuredly even if the ignition switch 68 is turned on while an automobile is in an inclined position. The sensor is also able to reduce power consumption while the automobile is in a state of standing.

Although the present exemplary embodiment is constructed to detect the zero position by forcibly operating the inclination angle sensor with the electromagnet 81, other method is available as such that the one-shot pulse circuit 82 is adapted to supply both of positive and negative currents one by one to the electromagnet at the moment the ignition switch 68 is turned on in order to swing the weight 80 about the rotary shaft 54, so as to make it capable of verifying an operation of the inclination angle sensor. The inclination angle sensor can be provided with a self-diagnostic function in this way.

Nineteenth Exemplary Embodiment

Figure 23:
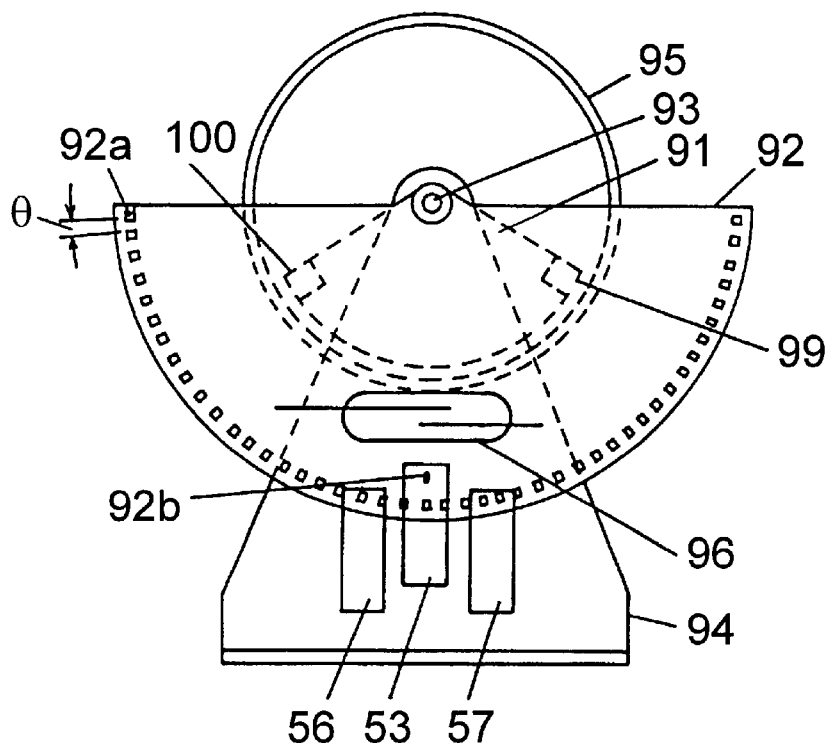
FIG. 23 is a front view depicting an inclination angle sensor of a nineteenth exemplary embodiment of the present invention.
Figure 24:
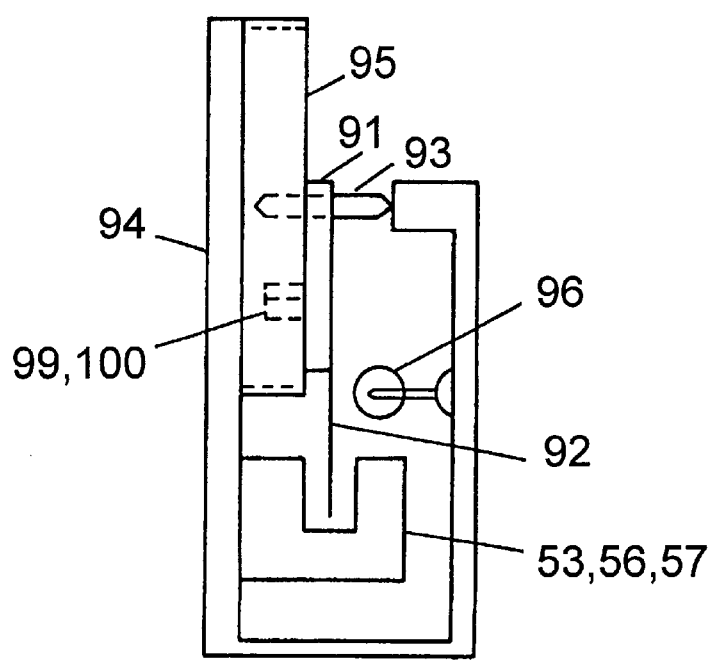
FIG. 24 is a side view of the same sensor.

FIG. 23 is a structural view of an inclination angle sensor of a nineteenth exemplary embodiment of the present invention, and FIG. 24 is a side view of the same sensor. In FIG. 23 and FIG. 24, 91 represents a weight made of non-magnetic material. 92 represents a thin slit plate fixed securely to the weight 91. The slit plate 92 is perforated with an "N" number of equally spaced angle detection slits 92a at intervals of θ° along a circumferential direction, and also a zero detection slit 92b for an indication of vertical direction in only one position corresponding to a photo-interrupter 53 at a different radial distance from the slit 52a. 93 represents a rotary shaft, about which the weight 91 can rotate freely. 94 represents a fixing body, which defines a case unit of the inclination angle sensor in this nineteenth exemplary embodiment. 53 represents a photo-interrupter consisting of mutually confronting light-emitting element and light-receiving element. The photo-interrupter 53 is fixed with respect to the fixing body 94 in a such position that light is transmitted through the zero detection slit 92b of the slit plate 92 when the inclination angle sensor is placed at 0° with respect to the vertical direction, and the light is shielded by the slit plate 92 when the inclination angle sensor is placed otherwise. 56 and 57 also represent photo-interrupters fixed with respect to the fixing body 94 in such positions where light is transmitted or shielded by the angle detection slits 92a in the circumferential direction of the slit plate 92, when the slit plate 92 rotates. The photo-interrupters 56 and 57 also take positions where they are shifted with each other by 90° in an emerging cycle of the angle detection slits 92a. 95 represents a non-magnetic conductor ring, which is arranged in a manner to keep a narrow space from a periphery of the weight 91, and fixed with respect to the fixing body 94. 96 represents a reed switch mounted on the fixing body 94. 99 and 100 represent magnets defining magnetic flux generation means. The magnets 99 and 100 are attached to the weight 91 in such positions that they can close contacts of the reed switch 96 when the weight 91 rotates toward both clockwise and counterclockwise directions to a predetermined angle. Furthermore, the magnets 99 and 100 attached to the weight 91 and the non-magnetic conductor ring 95 constitute an eddy current damping mechanism against rotation of the weight 91, and a space between the magnets 99 and 100 and the non-magnetic conductor ring 95 is adjusted in order to obtain an appropriate damping force. In this structure, the photo-interrupters 53, 56 and 57 in combination with the slit plate 92 having slits 92a and 92b constitute optical encoders.

The foregoing components operate in a manner as described hereinafter. The fixing body 94 is mounted with respect to an object being measured, and the weight 91 orients toward a direction of gravity. Therefore, if the object being measured inclines about the rotary shaft 93, the weight 91 and the slit plate 92 rotate with respect to the fixing body 94 in proportion to the inclination. This causes the photo-interrupters 53, 56 and 57 to output ON-OFF signals from their light-receiving elements as they pass by the slits in the slit plate 92. Since the photo-interrupters 56 and 57 are arranged in the positions where they are shifted 90° in phase from each other with respect to a cycle of the slits, the photo-interrupters 56 and 57 produce ON-OFF waveforms, which are displaced 90° in phase with respect to each other, when the slit plate 92 rotates. The sensor obtains a 0° signal from the photo-interrupter 53, so that it starts counting changes of edge from the photo-interrupters 56 and 57 at this point of time. Accordingly, a change in angle from 0° can be measured digitally with a formula of $(\theta \times n/4)°$, in which "n" denotes a number of counting. If a spaced angle between the slits 92a is set at 4°, for instance, the sensor is able to obtain an output of angle in a resolution of 1°.

Also, contacts of the reed switch 96 close, and produce a switching output when the weight 91 inclines toward both clockwise and counterclockwise directions to a predetermined angle. When the slit plate 92 rotates, the rotation is suppressed by an effect of electromagnetic damping force with an interaction of the magnets 99 and 100 attached to the weight 91 in proportion to a rotational velocity. This force can suppress an effect of external disturbances due to vibrations, etc.

The foregoing structure can achieve high resolution and reduction in size by obtaining a resolution level of $\theta/4$ in spite of a mechanical resolution of $\theta$. Also, a provision of a circuit including the reed switch connected in series with an active line of the system enable the system to turn into an active state only when it inclines by more than the predetermined angle, so as to realize a fail-safe function for preventing a systematic malfunction, even if an erroneous signal in output angle is supplied. Furthermore, the structure can reduce an overall size as compared to a structure in which a high-resolution sensor and a fail-safe sensor are constructed separately.

Twentieth Exemplary Embodiment

Figure 25:
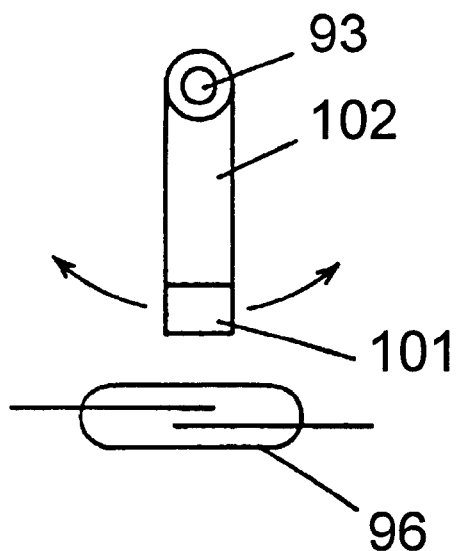
FIG. 25 is a front view showing a positional relation between a pendulum and a reed switch of an inclination angle sensor of a twentieth exemplary embodiment of the present invention.

FIG. 25 shows a positional relation between a weight and a reed switch of an inclination angle sensor of a twentieth exemplary embodiment of the present invention. Since the components not shown in FIG. 25 (slit plate 92, photo-interrupters 53, 56 and 57) have similar structure as those of the nineteenth exemplary embodiment, their description will be omitted.

In FIG. 25, 102 represents a weight. 101 represents a magnet fixed securely to the weight 102 in a position facing vertically downward. 96 represents a reed switch fixed to a fixing body 94 (not shown in the figure). The magnet 101 and the reed switch 96 are normally in such positional relation that contacts of the reed switch 96 are closed by magnetic force of the magnet 101 when the inclination angle sensor of this twentieth exemplary embodiment is at a horizontal state, and the contacts of the reed switch 96 open when the inclination angle sensor inclines by more than a predetermined angle due to a decrease in the magnetic force of the magnet 101.

As a result of operation in the foregoing structure, the inclination angle sensor produces an output similar to that shown in the nineteenth exemplary embodiment from the photo-interrupters. On the other hands, the inclination angle sensor produces an output of the reed switch 96 by opening the contacts, if it inclines by more than the predetermined angle.

The foregoing structure, which provides a circuit including the reed switch connected in series with an active line of the system, enables the system to turn into an active state when it inclines by more than the predetermined angle, and realizes a fail-safe function for preventing a systematic malfunction, even if an erroneous signal in output angle is supplied, in addition to achieving a high resolution in output angle.

Twenty-first Exemplary Embodiment

Figure 26:
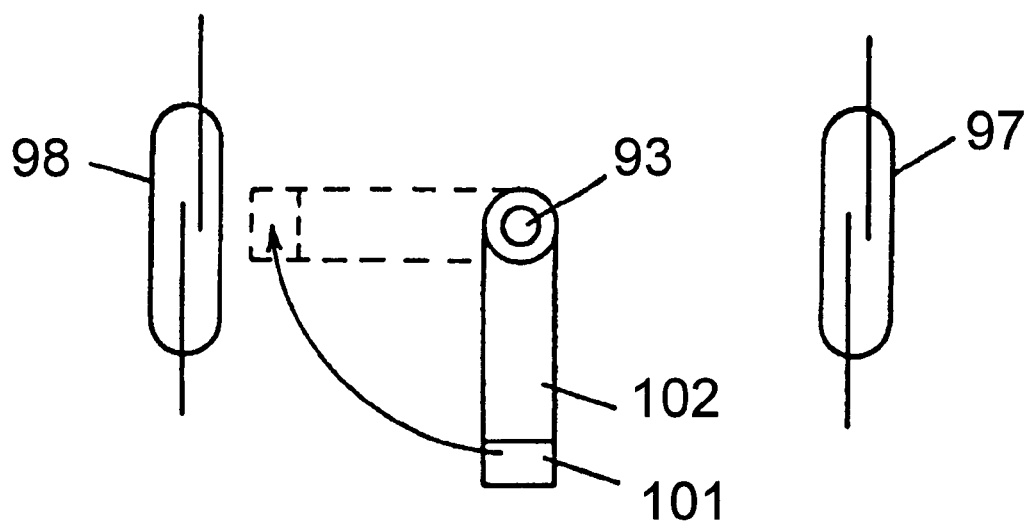
FIG. 26 is a front view showing a positional relation between a pendulum and a reed switch of an inclination angle sensor of a twenty-first exemplary embodiment of the present invention.
Figure 27:
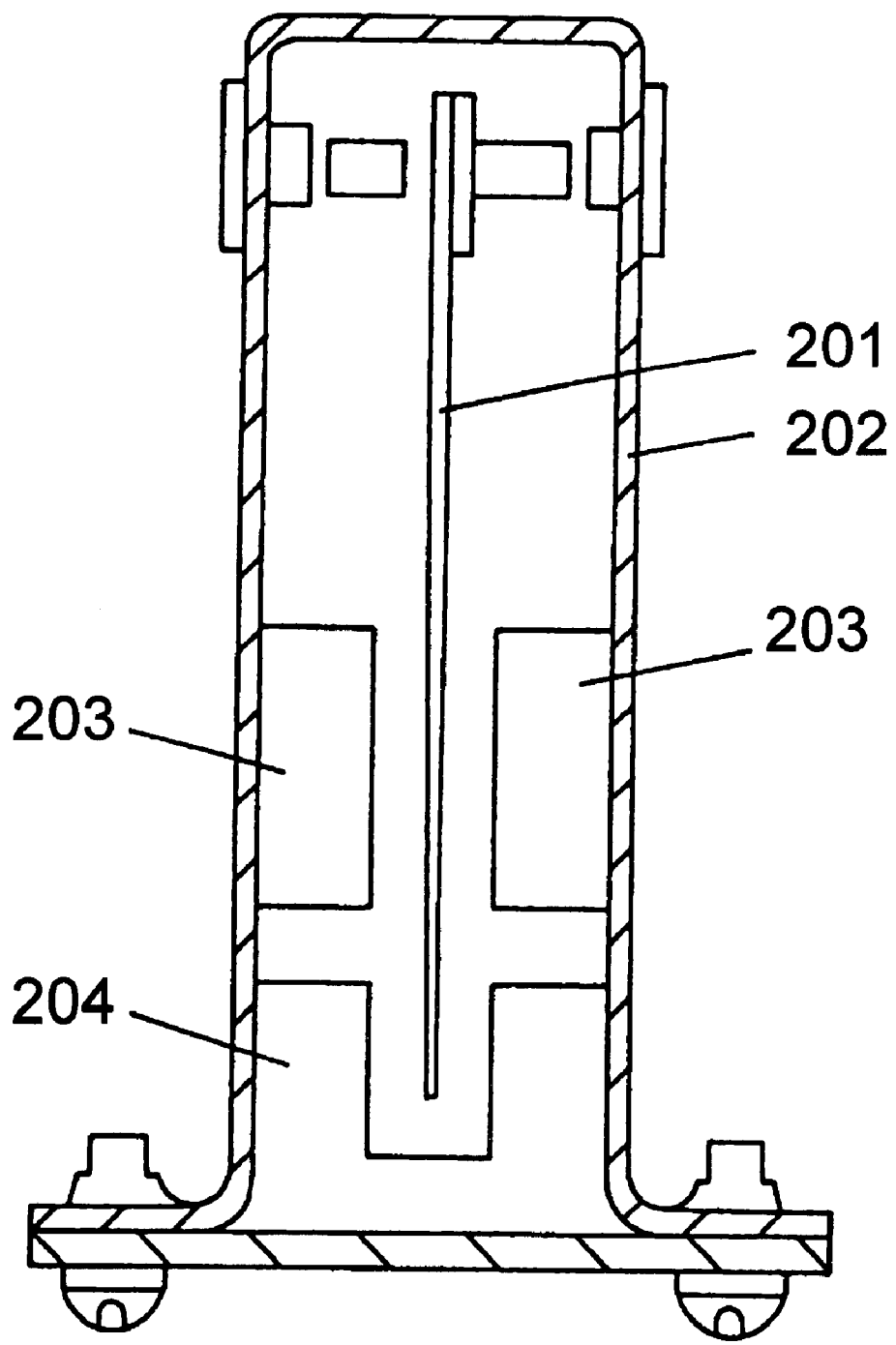
FIG. 27 is a cross-sectional view of an inclination angle sensor of the prior art.

FIG. 26 shows a positional relation between a weight and a reed switch of an inclination angle sensor of a twenty-first exemplary embodiment of the present invention. Since the components not shown in FIG. 26 (slit plate 92, photo-interrupters 53, 56 and 57) have similar structure as those of the nineteenth exemplary embodiment, their description will be omitted.

In FIG. 26, 102 represents a weight. 101 represents a magnet fixed securely to the weight 102 in a position facing vertically downward. 97 and 98 represent reed switches arranged at both right and left sides of the weight 102, and fixed to a fixing body 94 (not shown in the figure). The magnet 101 and the reed switches 97, 98 are normally in such positional relation that contacts of the reed switches 97 and 98 are open when the inclination angle sensor of this twenty-first exemplary embodiment is at a horizontal level, and one of the contacts of the reed switches 97 and 98 is closed by magnetic force of the magnet 101 when the inclination angle sensor inclines by more than a predetermined angle depending on clockwise or counterclockwise direction of the inclination.

As a result of operation in the foregoing structure, the inclination angle sensor produces an output similar to that shown in the nineteenth exemplary embodiment from the photo-interrupters. On the other hands, the inclination angle sensor produces an output of either one of the reed switches 97 and 98 by closing the contacts, if it inclines by more than the predetermined angle.

The foregoing structure, which provides a circuit including the reed switches connected in series with an active line of the system, enables the system to turn into an active state independently between the right side and the left side only when it inclines by more than the predetermined angle, and realizes a fail-safe function for preventing a systematic malfunction, even if an erroneous signal in output angle is supplied, in addition to achieving a high resolution in output angle.

As has been described, the present invention is able to realize an inclination angle sensor that is small in size in a radial direction without impairing its rotational performance, and capable of suppressing an effect of external disturbances such as vibrations, etc. of a vehicle.

Also, the present invention realizes an advantageous effect for the inclination angle sensor, which include reduction of an effect due to external disturbances other than gravity; gaining an angle signal of high resolution digitally, and easily attaining a reduction in size.

Moreover, the present invention provides the inclination angle sensor with a fail-safe function against a malfunction due to an electromagnetic interference, an end of life of the photo-interrupters, and the like, by using a reed switch containing a mechanically operative contact, in addition to digitally gaining an angle signal of high resolution. Furthermore, since the present invention enables the inclination angle sensor to share a pendulum, a damper and a shaft structure, it can reduce a size of the sensor when compared with one constructed of a high-resolution sensor and a fail-safe sensor separately.

What is claimed is:

1. An inclination angle sensor comprising:
   a slit plate supported rotatably about a rotary shaft, and having a zero detection slit and a plurality of equally spaced angle detection slits along a circumferential direction thereof;

a weight attached to said slit plate;

three pairs of photo-interrupters, each pair comprising a light-emitting element and a light-receiving element, fixed with respect to a bearing so that said light-emitting element and said light-receiving element confront each other with said slit plate therebetween; and an eddy current damping means fixed with respect to said bearing in a position for generating electromagnetic damping with said weight by an eddy current, first and second pairs of said three pairs of photo-interrupters are positioned so that light is transmitted or shielded by said angle detection slits in said slit plate, and are shifted from each other by 90° in phase of an emerging cycle of said angle detection slits in a rotational direction of said slit plate, and a third pair of said three pairs of photo-interrupters is positioned so that light is transmitted through said zero detection slit when said slit plate is in a position of 0°.

2. The inclination angle sensor according to claim 1, wherein said slit plate has a disc shape.

3. The inclination angle sensor according to claim 1, wherein said slit plate has a sector shape.

4. The inclination angle sensor according to claim 1, wherein said weight has a flat surface in a radial direction thereof, and said plate is attached to said flat surface of said weight.

5. The inclination angle sensor according to claim 1, wherein said inclination angle sensor is mounted on a vehicle, said weight is electrically conductive, and a center of gravity of said weight is arranged near a fixed shaft of said sensor in order to reduce sensitivity to a force, on said vehicle, except for a gravitational force.

6. The inclination angle sensor according to claim 1, wherein said weight is arranged only near a position of 0° in order to make said inclination angle sensor capable of detecting a slow variation in an angle near 0° and a sharp variation in an angle other than 0°.

7. The inclination angle sensor according to claim 1, further comprising a control means for processing angle information by receiving a signal from said three pairs of photo-interrupters, and for switching between a normal operation and an energy-saving operation by receiving an ON-OFF signal from an ignition switch.

8. The inclination angle sensor according to claim 1, wherein, said weight includes a magnet having a magnetic pole in a position facing vertically downward, and said eddy current damping means is an electromagnet provided in a position for generating electromagnetic damping with said magnet;

said inclination angle sensor further comprising:

a pulse circuit for supplying a pulse current to said electromagnet only when power thereto is turned on.

\* \* \* \* \*

UNITED STATES PATENT AND TRADEMARK OFFICE
CERTIFICATE OF CORRECTION

PATENT NO.    : 6,399,941 B1
DATED         : June 4, 2002
INVENTOR(S)   : Nakagaki et al.

It is certified that error appears in the above-identified patent and that said Letters Patent is hereby corrected as shown below:

Column 17,
Line 28, between "said" and "plate" insert -- slit --.

Signed and Sealed this

Eighteenth Day of February, 2003

JAMES E. ROGAN
*Director of the United States Patent and Trademark Office*